United States Patent
Penna et al.

(10) Patent No.: US 12,339,384 B2
(45) Date of Patent: Jun. 24, 2025

(54) UE POSITIONING AIDED BY RECONFIGURABLE REFLECTING SURFACES SUCH AS INTELLIGENT REFLECTING SURFACES (IRS)

(71) Applicant: Nokia Technologies Oy, Espoo (FI)

(72) Inventors: Frederico Penna, Paris (FR); Daejung Yoon, Massy (FR); Stefano Paris, Vanves (FR); Joerg Schaepperle, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 428 days.

(21) Appl. No.: 17/920,954

(22) PCT Filed: Apr. 27, 2020

(86) PCT No.: PCT/US2020/030087
§ 371 (c)(1),
(2) Date: Oct. 24, 2022

(87) PCT Pub. No.: WO2021/221603
PCT Pub. Date: Nov. 4, 2021

(65) Prior Publication Data
US 2023/0176174 A1 Jun. 8, 2023

(51) Int. Cl.
*H04B 7/04* (2017.01)
*G01S 5/00* (2006.01)
(Continued)

(52) U.S. Cl.
CPC .......... *G01S 5/0273* (2013.01); *G01S 5/0036* (2013.01); *H01Q 19/104* (2013.01); *G01S 2205/02* (2020.05)

(58) Field of Classification Search
CPC .. G01S 5/0273; G01S 5/0036; G01S 2205/02; G01S 5/10; G01S 2205/007;
(Continued)

(56) References Cited

U.S. PATENT DOCUMENTS

2020/0145977 A1* 5/2020 Kumar ................ H04W 56/001
2021/0302561 A1* 9/2021 Bayesteh ................ G01S 13/42
(Continued)

FOREIGN PATENT DOCUMENTS

WO   WO 2020/096506 A1   5/2020
WO   WO2020096506        5/2020

OTHER PUBLICATIONS

Wymeersch, Henk et al., "Radio Localization and Mapping with Reconfigurable Intelligent Surfaces," Cornell University Library, Ithaca, NY, Dec. 19, 2019.
(Continued)

*Primary Examiner* — Andrew Wendell
(74) *Attorney, Agent, or Firm* — Robert P. Michal, Esq.; Carter, DeLuca & Farrell LLP

(57) ABSTRACT

UE positioning is added by use of a reconfigurable reflecting surface (e.g., IRS). The IRS is configured to adjust elements of the surface. The configuration may include signal switching on or off, signal phase, group delay, or signal amplitude. Positioning reference signal transmissions are performed that have line of sight to the UE and that reflect off the IRS. The UE takes measurements for the transmissions and can determine measurement(s) of angle of arrival or time of arrival or reference signal received power, and/or determine a channel estimation. Multiple methods are proposed to provide UE positioning.

16 Claims, 14 Drawing Sheets

(51) Int. Cl.
  *G01S 5/02* (2010.01)
  *H01Q 19/10* (2006.01)
  *H04W 64/00* (2009.01)

(58) Field of Classification Search
  CPC .. G01S 5/0236; G01S 5/02521; G01S 5/0278; G01S 5/0218; H01Q 1/241; H01Q 3/46; H01Q 19/104; H04W 24/10; H04W 64/00; H04W 48/12; H04W 88/085; H04B 7/145; H04B 7/04013; H04B 17/101; H04B 17/253
  See application file for complete search history.

(56) References Cited

U.S. PATENT DOCUMENTS

| | | | |
|---|---|---|---|
| 2021/0359408 A1* | 11/2021 | Theofanopoulos | H01Q 3/36 |
| 2021/0377932 A1* | 12/2021 | Sun | H04W 72/542 |
| 2022/0247480 A1* | 8/2022 | Papadopoulos | G01S 5/0273 |

OTHER PUBLICATIONS

Gante, Joao et al., "Beamformed Fingerprint Learning for Accurate Millimeter Wave Positioning," 2018 IEEE 88th Vehicular Technology Conference, Aug. 27, 2018.

* cited by examiner

| SC space [KHz] | BW [MHz] | Below6G/ Above6G | FFT size | Sampling frequency [MHz] | Sampling time rate = ToA resolution [ns] | Distance resolution [m] (light speed × sample time) |
|---|---|---|---|---|---|---|
| 120 | 400 | A | 4096 | 491,52 | 2,03 | 0,61 |
| 120 | 200 | A | 2048 | 245,76 | 4,07 | 1,22 |
| 120 | 100 | A | 1024 | 122,88 | 8,14 | 2,44 |
| 120 | 50 | A | 512 | 61,44 | 16,28 | 4,88 |
| 60 | 200 | A | 4096 | 245,76 | 4,07 | 1,22 |
| 60 | 100 | A | 2048 | 122,88 | 8,14 | 2,44 |
| 60 | 50 | A | 1024 | 61,44 | 16,28 | 4,88 |
| 60 | 100 | B | 2048 | 122,88 | 8,14 | 2,44 |
| 60 | 80 | B | 2048 | 122,88 | 8,14 | 2,44 |
| 60 | 50 | B | 1024 | 61,44 | 16,28 | 4,88 |
| 60 | 40 | B | 1024 | 61,44 | 16,28 | 4,88 |
| 60 | 20 | B | 512 | 30,72 | 32,55 | 9,77 |
| 30 | 100 | B | 4096 | 122,88 | 8,14 | 2,44 |
| 30 | 80 | B | 4096 | 122,88 | 8,14 | 2,44 |
| 30 | 50 | B | 2048 | 61,44 | 16,28 | 4,88 |
| 30 | 40 | B | 2048 | 61,44 | 16,28 | 4,88 |
| 30 | 20 | B | 1024 | 30,72 | 32,55 | 9,77 |
| 15 | 50 | B | 4096 | 61,44 | 16,28 | 4,88 |
| 15 | 40 | B | 4096 | 61,44 | 16,28 | 4,88 |
| 15 | 20 | B | 2048 | 30,72 | 32,55 | 9,77 |

FIG. 3

UE POSITIONING AIDED BY RECONFIGURABLE REFLECTING SURFACES SUCH AS INTELLIGENT REFLECTING SURFACES (IRS)

CROSS REFERENCE TO RELATED APPLICATION

This patent application is a U.S. National Stage application of International Patent Application Number PCT/US2020/030087 filed Apr. 27, 2020, which is hereby incorporated by reference in its entirety.

TECHNICAL FIELD

This invention relates generally to positioning of User Equipment (UEs) in wireless networks and, more specifically, relates to positioning of the UEs using Intelligent Reflecting Surfaces (IRSs) or other reconfigurable reflecting surfaces.

BACKGROUND

It is noted that abbreviations that may be found in the specification and/or the drawing figures are defined below, at the end of the detailed description section.

Positioning, i.e., estimating the location of a UE, is regarded as an important feature of 5G NR networks. Traditionally, positioning in cellular networks (LTE and NR) is performed by a combination of RAT-independent (chiefly GNSS) and RAT-dependent (e.g., OTDOA, UTDOA, AoA/AoD) methods Enhancement of RAT-dependent methods is one of the objectives of NR Rel-16 and Rel-17, with the target of achieving more accurate positioning performance—ideally, up to centimeter-level—in GNSS-challenged environments such as indoor offices, industrial facilities, shopping centers, airports, stadiums, and the like.

RAT-dependent positioning techniques typically rely on a UE communicating with multiple BSs (or "gNB", in NR terminology) to exchange multiple ToA and/or AoA measurements. These techniques could be improved.

BRIEF SUMMARY

This section is intended to include examples and is not intended to be limiting.

In an exemplary embodiment, a method is disclosed that includes sending, by a network node in a wireless network, request of one or more settings to be applied by a reconfigurable reflecting surface to adjust elements of the surface for one or more positioning reference signal transmissions from a base station toward a user equipment. The method includes receiving by the network node one or more measurements taken by a user equipment for the one or more positioning reference signal transmissions. The one or more positioning reference signal transmissions have a line of sight path between the base station and the user equipment and a reflection path that reflects off the reconfigurable reflecting surface. The method includes calculating by the network node a position coordinate corresponding to the user equipment using the one or more measurements with knowledge of a location of the reconfigurable reflecting surface.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: sending, by a network node in a wireless network, request of one or more settings to be applied by a reconfigurable reflecting surface to adjust elements of the surface for one or more positioning reference signal transmissions from a base station toward a user equipment; receiving by the network node one or more measurements taken by a user equipment for the one or more positioning reference signal transmissions, wherein the one or more positioning reference signal transmissions have a line of sight path between the base station and the user equipment and a reflection path that reflects off the reconfigurable reflecting surface; and calculating by the network node a position coordinate corresponding to the user equipment using the one or more measurements with knowledge of a location of the reconfigurable reflecting surface.

An exemplary computer program product includes a computer-readable storage medium bearing computer program code embodied therein for use with a computer. The computer program code includes: code for sending, by a network node in a wireless network, request of one or more settings to be applied by a reconfigurable reflecting surface to adjust elements of the surface for one or more positioning reference signal transmissions from a base station toward a user equipment; code for receiving by the network node one or more measurements taken by a user equipment for the one or more positioning reference signal transmissions, wherein the one or more positioning reference signal transmissions have a line of sight path between the base station and the user equipment and a reflection path that reflects off the reconfigurable reflecting surface; and code for calculating by the network node a position coordinate corresponding to the user equipment using the one or more measurements with knowledge of a location of the reconfigurable reflecting surface.

In another exemplary embodiment, an apparatus comprises means for performing: sending, by a network node in a wireless network, request of one or more settings to be applied by a reconfigurable reflecting surface to adjust elements of the surface for one or more positioning reference signal transmissions from a base station toward a user equipment; receiving by the network node one or more measurements taken by a user equipment for the one or more positioning reference signal transmissions, wherein the one or more positioning reference signal transmissions have a line of sight path between the base station and the user equipment and a reflection path that reflects off the reconfigurable reflecting surface; and calculating by the network node a position coordinate corresponding to the user equipment using the one or more measurements with knowledge of a location of the reconfigurable reflecting surface.

In a further exemplary embodiment, a method is disclosed that includes sending, by a base station in a wireless network and toward both a reconfigurable reflecting surface and a user equipment, configuration to be applied by the reconfigurable reflecting surface to adjust elements of the surface. The configuration is to be used for one or more positioning reference signal transmissions from the network node toward the user equipment, wherein the one or more positioning reference signal transmissions have a direct path between the base station and the user equipment and a reflection path that reflects off the reconfigurable reflecting surface. The method also includes sending by the base station configuration to the user equipment to cause the user equipment to perform one or more measurements for the one or more positioning reference signal transmissions. The method includes performing by the base station the one or more positioning reference signal transmissions with the user equipment, and receiving by the base station one or more measurement reports comprising indication of the one or more measurements.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: sending, by a base station in a wireless network and toward both a reconfigurable reflecting surface and a user equipment, configuration to be applied by the reconfigurable reflecting surface to adjust elements of the surface, the configuration to be used for one or more positioning reference signal transmissions from the network node toward the user equipment, wherein the one or more positioning reference signal transmissions have a direct path between the base station and the user equipment and a reflection path that reflects off the reconfigurable reflecting surface; sending by the base station configuration to the user equipment to cause the user equipment to perform one or more measurements for the one or more positioning reference signal transmissions; performing by the base station the one or more positioning reference signal transmissions with the user equipment; and receiving by the base station one or more measurement reports comprising indication of the one or more measurements.

An exemplary computer program product includes a computer-readable storage medium bearing computer program code embodied therein for use with a computer. The computer program code includes: code for sending, by a base station in a wireless network and toward both a reconfigurable reflecting surface and a user equipment, configuration to be applied by the reconfigurable reflecting surface to adjust elements of the surface, the configuration to be used for one or more positioning reference signal transmissions from the network node toward the user equipment, wherein the one or more positioning reference signal transmissions have a direct path between the base station and the user equipment and a reflection path that reflects off the reconfigurable reflecting surface; code for sending by the base station configuration to the user equipment to cause the user equipment to perform one or more measurements for the one or more positioning reference signal transmissions; code for performing by the base station the one or more positioning reference signal transmissions with the user equipment; and code for receiving by the base station one or more measurement reports comprising indication of the one or more measurements.

In another exemplary embodiment, an apparatus comprises means for performing: sending, by a base station in a wireless network and toward both a reconfigurable reflecting surface and a user equipment, configuration to be applied by the reconfigurable reflecting surface to adjust elements of the surface, the configuration to be used for one or more positioning reference signal transmissions from the network node toward the user equipment, wherein the one or more positioning reference signal transmissions have a direct path between the base station and the user equipment and a reflection path that reflects off the reconfigurable reflecting surface; sending by the base station configuration to the user equipment to cause the user equipment to perform one or more measurements for the one or more positioning reference signal transmissions; performing by the base station the one or more positioning reference signal transmissions with the user equipment; and receiving by the base station one or more measurement reports comprising indication of the one or more measurements.

Another example is a method is disclosed that includes receiving, by user equipment and from a base station in a wireless network, configuration to be applied by a reconfigurable reflecting surface to adjust elements of the surface, the configuration to be applied by the reconfigurable reflecting surface to adjust elements of the surface. The configuration is to be used for one or more positioning reference signal transmissions by the base station toward the user equipment, wherein the one or more positioning reference signal transmissions have a line of sight path between the base station and the user equipment and a reflection path that reflects off the reconfigurable reflecting surface. The method includes receiving, by user equipment and from the network node, configuration to cause the user equipment to perform one or more measurements for the one or more positioning reference signal transmissions; The method includes receiving, by the user equipment and from the network node, the one or more positioning reference signal transmissions. The method further includes performing the one or more measurements on signals received during the one or more positioning reference signal transmissions and sending, by the user equipment and toward the network node, one or more measurement reports comprising indication of the one or more measurements.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, by user equipment and from a base station in a wireless network, configuration to be applied by a reconfigurable reflecting surface to adjust elements of the surface, the configuration to be applied by the reconfigurable reflecting surface to adjust elements of the surface, the configuration to be used for one or more positioning reference signal transmissions by the base station toward the user equipment, wherein the one or more positioning reference signal transmissions have a line of sight path between the base station and the user equipment and a reflection path that reflects off the reconfigurable reflecting surface; receiving, by user equipment and from the network node, configuration to cause the user equipment to perform one or more measurements for the one or more positioning reference signal transmissions; receiving, by the user equipment and from the network node, the one or more positioning reference signal transmissions; performing the one or more measurements on signals received during the one or more positioning reference signal transmissions; and sending, by the user equipment and toward the network node, one or more measurement reports comprising indication of the one or more measurements.

An exemplary computer program product includes a computer-readable storage medium bearing computer program code embodied therein for use with a computer. The computer program code includes: code for receiving, by user equipment and from a base station in a wireless network, configuration to be applied by a reconfigurable reflecting surface to adjust elements of the surface, the configuration to be applied by the reconfigurable reflecting surface to adjust elements of the surface, the configuration to be used for one or more positioning reference signal transmissions by the base station toward the user equipment, wherein the one or more positioning reference signal transmissions have a line of sight path between the base station and the user equipment and a reflection path that reflects off the reconfigurable reflecting surface; code for receiving, by user equipment and from the network node, configuration to cause the user equipment to perform one or more measurements for the one or more positioning reference signal transmissions; code for receiving, by the user equipment and from the network node, the one or more positioning reference signal transmissions; code for performing the one or more measurements on signals received during the one or more positioning reference signal transmissions; and code for sending, by the user equipment and toward the network node, one or more measurement reports comprising indication of the one or more measurements.

In another exemplary embodiment, an apparatus comprises means for performing: receiving, by user equipment and from a base station in a wireless network, configuration to be applied by a reconfigurable reflecting surface to adjust elements of the surface, the configuration to be applied by the reconfigurable reflecting surface to adjust elements of the surface, the configuration to be used for one or more positioning reference signal transmissions by the base station toward the user equipment, wherein the one or more positioning reference signal transmissions have a line of sight path between the base station and the user equipment and a reflection path that reflects off the reconfigurable reflecting surface; receiving, by user equipment and from the network node, configuration to cause the user equipment to perform one or more measurements for the one or more positioning reference signal transmissions; receiving, by the user equipment and from the network node, the one or more positioning reference signal transmissions; performing the one or more measurements on signals received during the one or more positioning reference signal transmissions; and sending, by the user equipment and toward the network node, one or more measurement reports comprising indication of the one or more measurements.

A further example is a method that includes receiving, by a system comprising a reconfigurable reflecting surface and from a network node, a request for configuration to be applied by the reconfigurable reflecting surface to adjust elements of the surface. The configuration is to be used for one or more positioning reference signal transmissions by the network node toward a user equipment, wherein the one or more positioning reference signal transmissions have a line of sight path between the base station and the user equipment and a reflection path that reflects off the reconfigurable reflecting surface. The method includes responding by the system to the request by either indicating all of the configuration in the request is approved or indicating a part of the configuration that is approved, wherein configuration to be applied is either all of the configuration in the request or the part of the configuration that is approved. The method includes applying by the system the configuration to be applied, to adjust elements of the reconfigurable reflecting surface for at least one of the one or more positioning reference signal transmissions.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, by a system comprising a reconfigurable reflecting surface and from a network node, a request for configuration to be applied by the reconfigurable reflecting surface to adjust elements of the surface, the configuration to be used for one or more positioning reference signal transmissions by the network node toward a user equipment, wherein the one or more positioning reference signal transmissions have a line of sight path between the base station and the user equipment and a reflection path that reflects off the reconfigurable reflecting surface; responding by the system to the request by either indicating all of the configuration in the request is approved or indicating a part of the configuration that is approved, wherein configuration to be applied is either all of the configuration in the request or the part of the configuration that is approved; and applying by the system the configuration to be applied, to adjust elements of the reconfigurable reflecting surface for at least one of the one or more positioning reference signal transmissions.

An exemplary computer program product includes a computer-readable storage medium bearing computer program code embodied therein for use with a computer. The computer program code includes: code for receiving, by a system comprising a reconfigurable reflecting surface and from a network node, a request for configuration to be applied by the reconfigurable reflecting surface to adjust elements of the surface, the configuration to be used for one or more positioning reference signal transmissions by the network node toward a user equipment, wherein the one or more positioning reference signal transmissions have a line of sight path between the base station and the user equipment and a reflection path that reflects off the reconfigurable reflecting surface; code for responding by the system to the request by either indicating all of the configuration in the request is approved or indicating a part of the configuration that is approved, wherein configuration to be applied is either all of the configuration in the request or the part of the configuration that is approved; and code for applying by the system the configuration to be applied, to adjust elements of the reconfigurable reflecting surface for at least one of the one or more positioning reference signal transmissions.

In another exemplary embodiment, an apparatus comprises means for performing: receiving, by a system comprising a reconfigurable reflecting surface and from a network node, a request for configuration to be applied by the reconfigurable reflecting surface to adjust elements of the surface, the configuration to be used for one or more positioning reference signal transmissions by the network node toward a user equipment, wherein the one or more positioning reference signal transmissions have a line of sight path between the base station and the user equipment and a reflection path that reflects off the reconfigurable reflecting surface; responding by the system to the request by either indicating all of the configuration in the request is approved or indicating a part of the configuration that is approved, wherein configuration to be applied is either all of the configuration in the request or the part of the configuration that is approved; and applying by the system the configuration to be applied, to adjust elements of the reconfigurable reflecting surface for at least one of the one or more positioning reference signal transmissions.

BRIEF DESCRIPTION OF THE DRAWINGS

In the attached Drawing Figures:

FIG. 3 is a table (Table 1) providing numerical examples, where sample times (which can be interpreted as the minimum resolvable interval between two consecutive paths) are reported for different NR numerologies;

FIG. 4A illustrates a use case of multiple delay paths and angles distinguishable by a narrow beam, whereas FIG. 4B illustrates a use case of multiple delay paths and angles indistinguishable by beams (omni-directional);

FIG. 10A illustrates zero delay, FIG. 10B illustrates $\lambda/4$ delay, FIG. 10C illustrates $2\lambda/4$ delay, and FIG. 10D illustrates $3\lambda/4$ delay, and where $\lambda$ is a wave length, B is base station, and I is IRS in the figures.

DETAILED DESCRIPTION OF THE DRAWINGS

Figure 1:
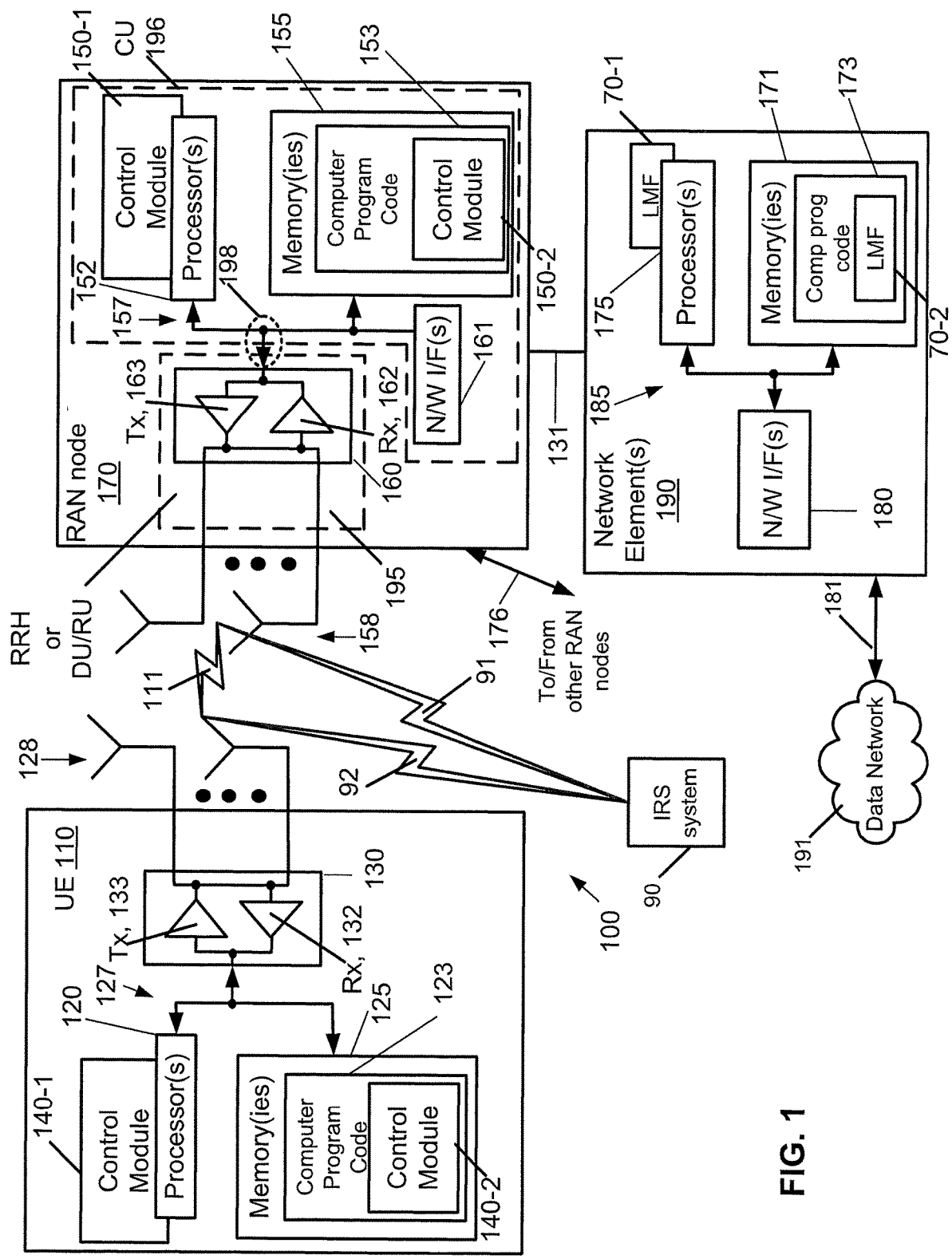
FIG. 1 is a block diagram of one possible and non-limiting exemplary system in which the exemplary embodiments may be practiced.

It is noted that abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for aiding UE positioning using reconfigurable reflecting surfaces such as Intelligent Reflecting Surfaces (IRSs). Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, IRS system 90, and network element(s) 190 are illustrated.

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

The UE 110 communicates with RAN node 170 via a wireless link 111. The UE 110 may also communicate via the links 91, 92 and the IRS system 90 with the RAN node 170. The IRS system 90 can include an IRS array and IRS controller, which are described in more detail below.

The RAN node 170 is a base station that provides access by wireless devices such as the UE 110 to the wireless network 100. The RAN node 170 may be, for instance, a base station for 5G, also called New Radio (NR). In most of this document, the RAN node 170 is referred to as a gNB 170, although the RAN node may be other network access nodes as described herein. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. One such function may also be a Location Management Function (LMF) 70, which is a network node performing some of the processing described herein in certain exemplary embodiments. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. In some embodiments, the processor (or other circuitry) can comprise the LMF 70-1 and/or the LMF 70-1 could be implemented in the computer (comp) program (prog) code 173 and executed by the one or more processors 175. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Briefly, the exemplary embodiments propose to exploit reconfigurable reflecting surfaces, such as Intelligent Reflecting Surfaces (IRSs) and Large Intelligent Surfaces (LISs), for aiding positioning in NR and other wireless networks. IRSs/LISs are relatively new devices, based on RF micro-electromechanical systems (MEMS) or metamaterials, consisting of a large number of passive and/or active reflecting elements, whose phase can be dynamically configured. Before additional details about the exemplary embodiments are provided, details about the technical area in which the embodiments are involved is provided.

In more detail, IRSs/LISs are planar surfaces composed of low-cost passive reflective elements that enable the controlled reflection of incident radio signals. Current implementations of IRS and LIS are based on mechanical structures, reconfigurable reflect arrays, liquid crystal metastructures, and programmable metamaterials or a combination of the above. See the following for examples: (1) Liaskos, et al. A new wireless communication paradigm through software-controlled metasurfaces, IEEE Communications Magazine, 56(9), pp. 162-169 (2018); (2) Tasolamprou, et al., Exploration of Intercell Wireless Milimeter-Wave Communication in the Landscape of Intelligent Metasurfaces, arXiv preprint arXiv:1907.02395 (2019); (3) Q. Wu and R. Zhang, Towards smart and reconfigurable environment: Intelligent reflecting surface aided wireless network, arXiv preprint arXiv:1905.00152 (2019); (4) Yang, et al., A programmable metasurface with dynamic polarization, scattering and focusing control, Scientific reports, 6, p. 35692 (2016); (5) Liu, et al., Flexible controls of broadband electromagnetic wavefronts with a mechanically programmable metamaterial, Scientific reports, 9(1), p. 1809 (2019); and (6) Tasolamprou, et al., Exploration of Intercell Wireless Milimeter-Wave Communication in the Landscape of Intelligent Metasurfaces, arXiv preprint arXiv:1907.02395 (2019).

Metamaterials are complex structures of resonant elements smaller than the wavelength of the electromagnetic wave. These elements called meta-atoms show an electric and magnetic response to electromagnetic radiation stronger than natural materials. See references (1) to (4) that have been previously cited. When an EM wave irradiates a metasurface, it creates currents via induction whose intensity and pattern depend on the geometry and composition of meta-atoms inside the metasurface. The main advantage of metamaterials over naturally occurring materials is that their electromagnetic properties can be designed and controlled by choosing the shape of meta-atoms and the way they are arranged within the structure. See reference (3). A method to dynamically control/adapt the EM response of the metasurface is based on integrating electronic devices like Positive-Intrinsic-Negative (PIN) diodes, Field-Effect Transistors (FETs), or Microelectromechanical System (MEMS) switches. See references (3) and (4). A PIN diode integrated in the design of a meta-atom enables two possible phase shifts for the reflected signal (e.g., 0 and 180 degrees), whereas resistors allows to dissipate part of the signal energy, thus effectively attenuating its amplitude (i.e., multiplying the signal amplitude by a coefficient in [0,1]). The integration of several PIN diodes and resistors in the design of a meta-atom permits an increase in the possible states of attenuation and phase shift of a single meta-atom, but the complexity of the metasurface grows exponentially with the product of the number of meta-atoms and states.

More complex metasurface designs (see reference (5)) introduce a combination of meta-atoms composed of diode arrays and mechanical systems that adjust the 3D physical structure of the metasurface. This type of design enables the control of the polarization and group delay of the reflected wave in addition to the amplitude and phase.

The possibility of controlling several properties of the reflected radio signal using IRS and LIS paves the way for a reconfigurable propagation environment where the channel model can be treated as a pseudo-deterministic rather than completely stochastic process (see reference (6)). Therefore, IRS and LIS add another dimension in the control of wireless networks, allowing tuning the parameters of the IRS/LIS to steer the energy of reflected signals in order to improve the communication.

Figure 2:
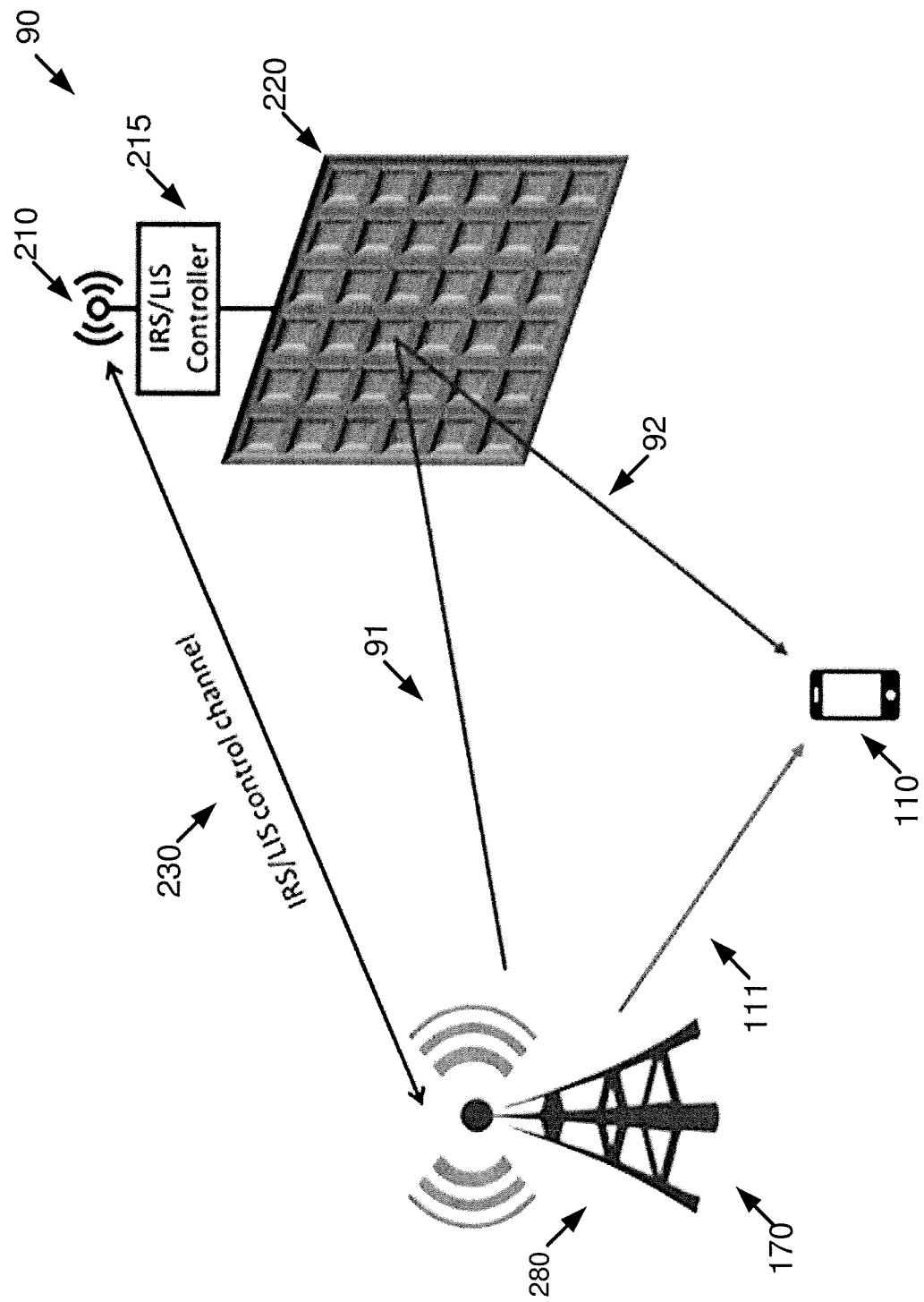
FIG. 2 illustrates a typical architecture of an IRS/LIS aided wireless system.

FIG. 2 shows the typical architecture of an IRS/LIS aided wireless system. FIG. 2 illustrates a gNB 170 communicating using radio tower 280 with a UE 110 and an IRS system 90, via links 91, 92, and 111. The IRS system 90 includes a wireless control with a wireless receiver 210, or may include a wired control channel with IRS/LIS controller 215, and an IRS array 220. The IRS/LIS controller 215 which tunes the parameters of the meta-atoms can be remotely controlled through a dedicated channel 230, shown as an IRS/LIS control channel. The link 111 is a direct signal over a direct path, whereas the links 91 and 92 are for a reflected signal (reflected off the IRS array 220) for a reflection (also called reflected) path.

Figure 2A:
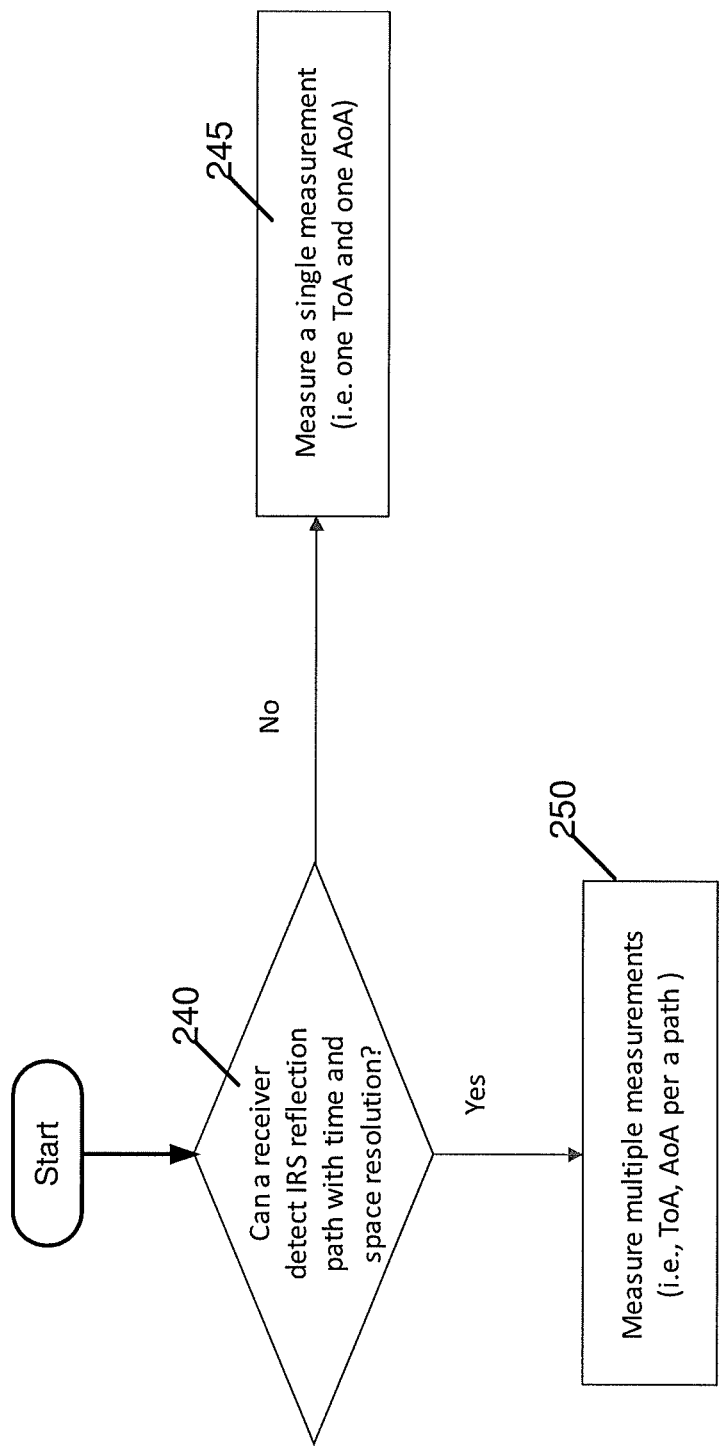
FIG. 2A illustrates a block diagram of a method for an IRS use case for positioning used in studies for IRS.

FIG. 2A illustrates a block diagram of a method for an IRS use case for positioning used in studies for IRS. In this example, in block 240, a UE determines if a receiver can detect an IRS reflection with time and space resolution. If not (block 240=No), the UE measures a single measurement in block 245. This is one ToA measurement and one AoA measurement. If so (block 240=Yes), the UE measures (block 250) multiple measurements (i.e., ToA, AoA per a path).

Possible issues with this type of system and method are described as follows. Positioning methods using time of arrival (ToA), angle of departure (AoD) or angle of arrival (AoA) have been studied and adopted in the 3GPP for NR RAT-dependent positioning. As mentioned above, these methods require a UE 110 to exchange measurements with multiple (e.g., at least 3) gNBs, including the serving one and other neighboring ones.

Some recent studies [see (7) C. Gentner, at al., "Multipath Assisted Positioning with Simultaneous Localization and Mapping," in IEEE Transactions on Wireless Communications, vol. 15, no. 9, pp. 6104-6117 (September 2016); and (8) B. Hu, et al, "Simultaneous position and reflector estimation (SPRE) by single base-station," 2018 IEEE Wireless Communications and Networking Conference (WCNC), Barcelona, pp. 1-6 (2018)] and 3GPP contributions [see R1-1901263, "On single-BS positioning technique", Huawei/HiSilicon, 3GPP TSG RAN WG1 Ad-Hoc Meeting 1901, Taipei, Taiwan, 21-25 January (2019)] proposed to use "simultaneous localization and mapping (SLAM)" techniques for NR positioning. SLAM, already successfully used in robotics, is based on the concept of jointly estimating the unknown position of the agent (in this case, the UE) as well as the positions of the reflecting objects in the environment.

This principle works if two key assumptions are satisfied: (1) the environment (including the reflectors) remains stationary while SLAM is performed, and (2) the multipath components (corresponding to different reflectors) are resolvable in the time domain and in the angular domain.

Note that the resolvability of multipath components in the time domain depends on the environment geometry and on the system bandwidth: the larger the bandwidth, the finer the resolution capability.

Multipath resolvability in the angular domain, on the other hand, is related to the beam width at the gNB and/or UE (e.g., if Tx/Rx beam sweeping is used for AoA/AoD estimation) or on the number of antennas at the UE, the antenna array response, and other signal parameters such as signal strength (e.g., if subspace-based techniques such as MUSIC/ESPRIT are used for AoA/AoD estimation).

In general, both assumptions (1) and (2) are unlikely to be met in realistic NR use cases. First of all, many NR use cases are characterized by UE mobility and non-stationary environments. Then, regarding time resolvability, the NR system bandwidths (especially under FR1, frequency response #1) are relatively narrow (compared, for example, to UWB systems, which are the state-of-the-art reference for accurate indoor positioning) and thus may not be able to resolve closely spaced multipath components. Some numerical examples are provided in Table 1 of FIG. 3, where sample times (which can be interpreted as the minimum resolvable interval between two consecutive paths) are reported for different NR numerologies. Note that this table uses a European-style view of numbering, where a comma is used instead of a period (i.e., 491,52=491.52). This illustrates the following columns: the SC (subcarrier) space in kHz; the BW (bandwidth) in MHz; whether this is below (B) or above (A) 6G; FFT size; the sampling frequency in MHz; the sampling time rate, which is equal to ToA resolution (in ns); and the distance resolution in meters. Above 6G and Below 6G are abbreviations of 'Above 6 GHz use case' (also known as FR2, frequency rang 32) and 'Below 6 GHz use case' (also knowns as FR1, frequency range 1). The last column of the table translates the time resolution into a distance (by multiplying by the speed of light), which shows that in some cases even multipath components originating at almost 10 m apart may not be distinguishable.

Figure 4A:
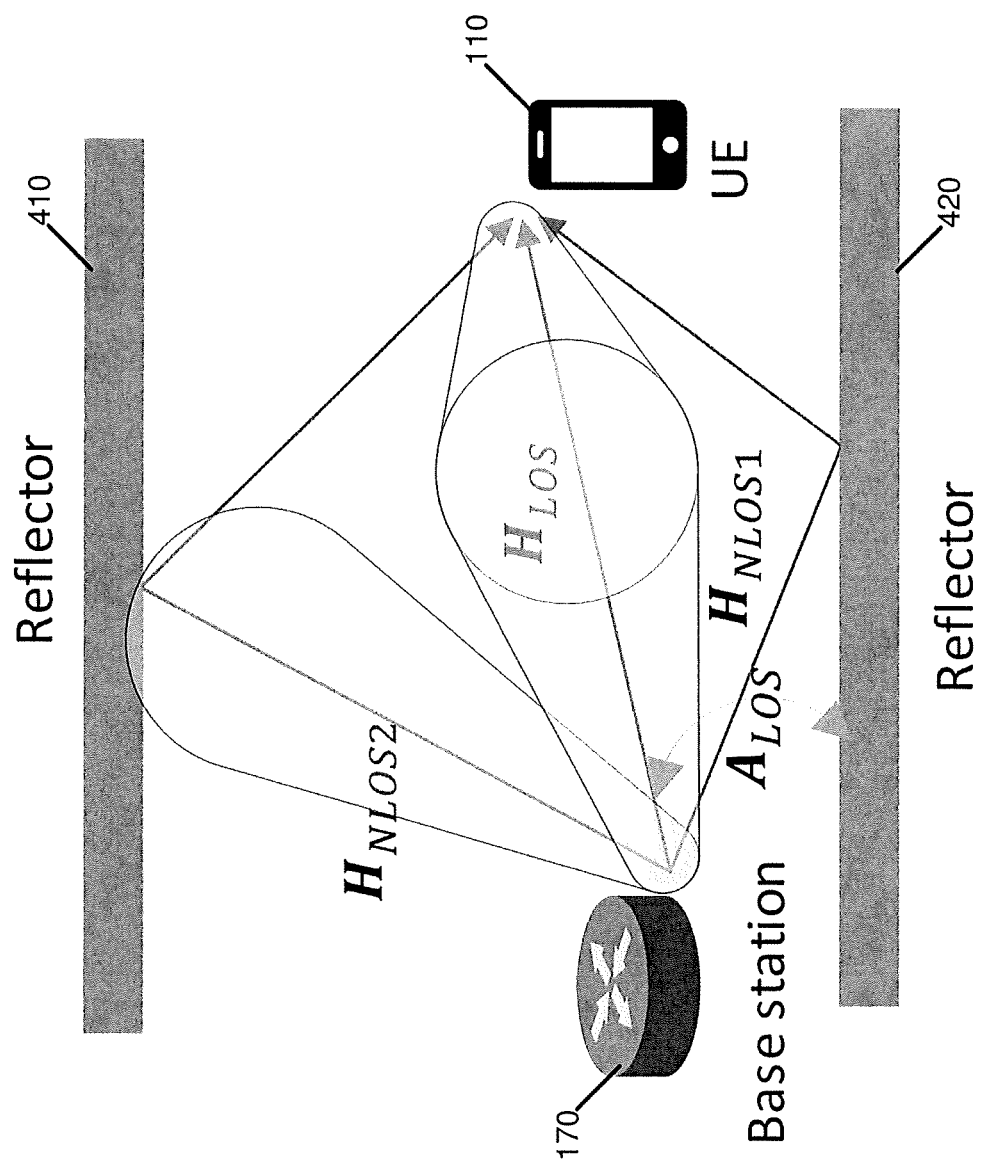
FIGS. 4A and 4B illustrate angle-based and ToA-based positioning concepts, where
Figure 4B:
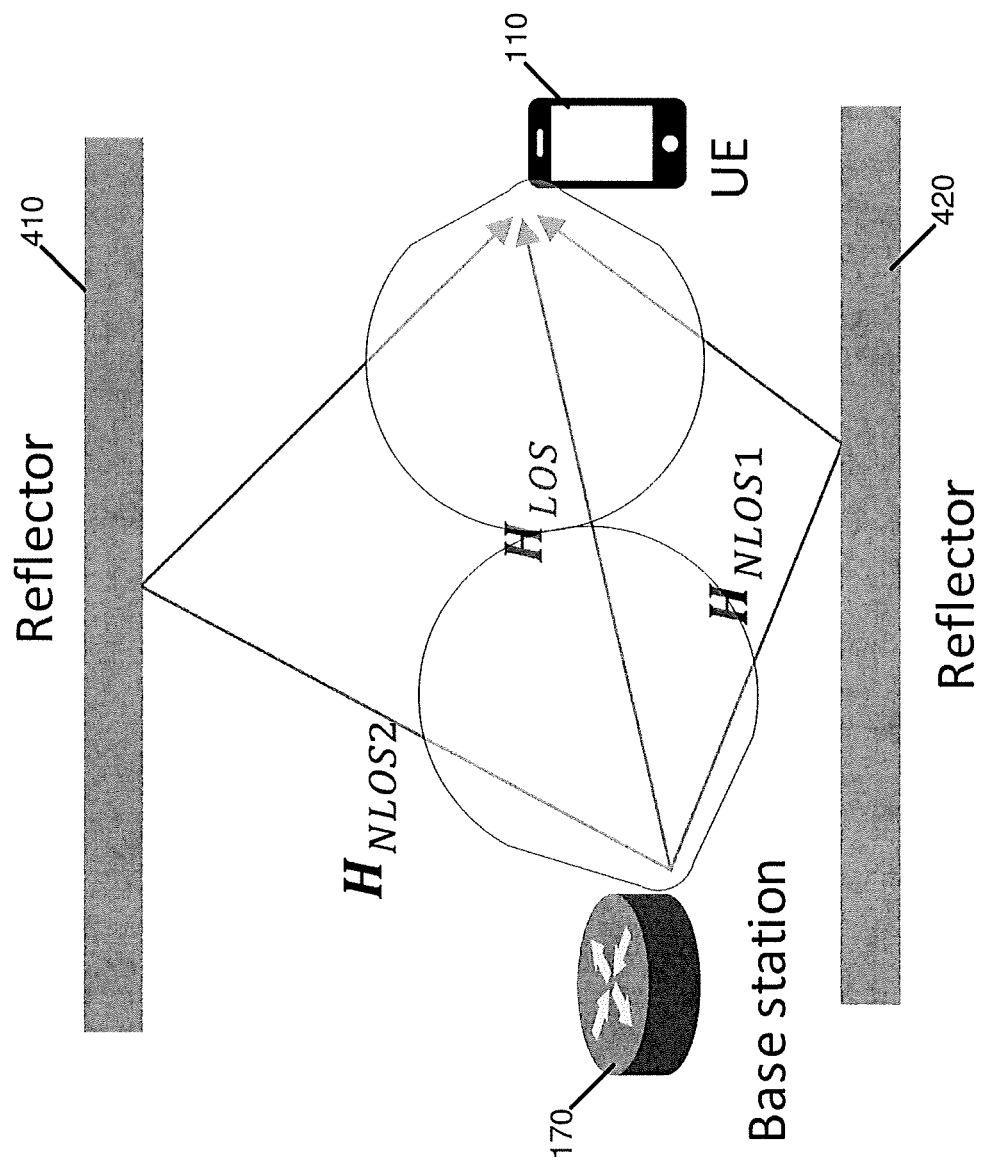

As for angle resolvability, even if gNB beams can be relatively narrower than a UE beam, UE beams may be still quasi-omnidirectional in mm-Wave systems. Also, angular resolvability of MUSIC/ESPRIT is limited. Multiple Signal Classification (MUSIC) and Estimation of Signal Parameters via Rational Invariance Techniques (ESPRIT) are conventional beamforming algorithms FIG. 4A shows an example of resolvable beams and FIG. 4B shows an example of non-resolvable beams due to omni-directional beam. FIG. 4A illustrates a use case of multiple delay paths and angles distinguishable by a narrow beam, whereas FIG. 4B illustrates a use case of multiple delay paths and angles indistinguishable by beams (omni-directional).

In terms of the problems of time-domain and space-domain resolvability, these differ as follows. For time-domain resolvability between multiple paths, this depends on the physical delay between the multiple paths and on the system bandwidth. Meanwhile, for space-domain resolvability, this depends on the specific algorithm used by the receiver for AoA estimation.

In FIG. 4A, the base station 170 has a line of sight (LOS) signal to the UE 110, characterized by the matrix $H_{LOS}$, and at an angle from a surface of reflector 420 of $A_{LOS}$. The base station 170 also has a reflected signal characterized by a matrix $H_{NLOS1}$, which is reflected from the reflector 420 to the UE 110. The base station 170 further has a reflected signal characterized by a matrix $H_{NLOS2}$, which is reflected from the reflector 410 to the UE 110. These signals can be resolved. For instance, legacy methods are designed to use reflector paths and assume high time-resolutions for ToA measurements and narrow beams for angle-measurements as in FIG. 4A.

A problem in practice is that the time-domain or the space-domain resolutions may not be high enough to use such ToA or AoA approaches as FIG. 4B in certain scenarios. Multiple path signals are superposed, and then may not be distinguishable in a UE side. That is, in order to use signal from different reflecting paths, the beam should be narrow with high resolution. If a beam is wide, the signal might not be able to be resolved.

Considering the aforementioned difficulties of SLAM-based approaches in cellular scenarios, it is proposed herein to use fixed and controllable reflectors (IRS/LIS) instead of relying on unknown reflectors that may or may not be present in the environment. Furthermore, exemplary proposed ideas herein are suitable especially for indoor environments (factories, offices, stadiums, and the like) where IRS/LIS can be pre-installed and monitored, although the exemplary embodiments are suitable for other locations too. While IRS/LIS involve an additional cost for the network, their use results in significant positioning accuracy improvement which is worthwhile in all cases where precise knowledge of UE location is beneficial.

It is believed in ref (3), the use of IRS was proposed for the first time in wireless communication networks. Specifically, in reference (3), an IRS is used to enhance a point-to-point MISO (multiple input, single output) communication system where the receiver simultaneously receives the direct signal from the access point and a second version of the same signal, reflected by the IRS. The access point beamformer and the IRS phase shifts are jointly optimized so as to maximize the total signal strength at the receiver.

On the other hand, prior works on SLAM-based approaches for positioning in 5G networks (e.g., see references (7), (8), and (9)) propose to exploit reflected signals (due to naturally occurring scattering in a multipath propagation environment) for positioning enhancement. However, there is a substantial difference between this approach and using ad-hoc, controllable reflecting surfaces (IRS/LIS) as are proposed herein. As mentioned above, for instance, SLAM approaches require a number of assumptions that are unlikely to be verified in practical NR use cases, whereas IRS/LIS can be used in such a manner as to guarantee a much higher degree of robustness and reliability to the positioning system.

By contrast, it is proposed herein to use IRS/LIS to aid positioning in NR. This is different from previously proposed SLAM-based approaches (see references (7), (8), and (9)) that exploit the surrounding reflectors in an opportunistic manner but cannot work in a reliable manner due to the unpredictability and non-stationarity of the radio environment.

First, an overview is provided, and then additional details are provided. As an overview, exemplary embodiments herein comprise one or more of the following features:

(i) A procedure for the identification of the ToA and AoA of the IRS (reflected) path.

(ii) A procedure whereby the UE reports the number of resolvable multipath components, in the time domain and in the angular domain, to the BS or to a network entity called "location management function (LMF)", for the enhancement of OTDOA-based positioning.

(iii) A procedure (applicable when the direct and reflected paths are resolvable in time domain) whereby the IRS phases Θ and the BS precoder W are optimized so as to maximize the received power, alternatively, for the direct and for the reflected path.

(iv) A procedure (applicable when the direct and reflected paths are resolvable in time domain) whereby the IRS phases Θ and the BS precoder W are optimized so as to maximize a convex combination of the received power of the direct and of the reflected path.

(v) A procedure for fingerprinting-based positioning aided by IRS/LIS, i.e., where a fingerprint is created by measuring the received signal strength for different values of phases of the IRS/LIS.

(vi) A procedure for fingerprinting-based positioning aided by IRS/LIS where, in addition to the steps described in (v), machine learning methods (e.g., artificial neural networks or mixture density networks) are used to establish a match between the UE locations and the fingerprints.

(vii) A procedure (applicable when the direct and reflected paths are resolvable in time domain) for ToA estimation using IRS/LIS.

(viii) Extensions of the above procedures to the case where the involved channels are multipath channels with a non-flat frequency response and the phase and amplitude of the frequency response of the IRS is a function of the frequency.

(ix) Procedures for the case where the IRS is active, i.e., contains one or more of a receiver with a low-noise amplifier, a transmitter with power amplifier, analog-to-digital conversion, digital-to-analog conversion and digital processing like, e.g., an FFT.

(x) A procedure for estimating the channel state information of the reflected and the direct path in the case where the IRS is passive and can neither send pilot signals nor perform channel estimation.

Figure 5:
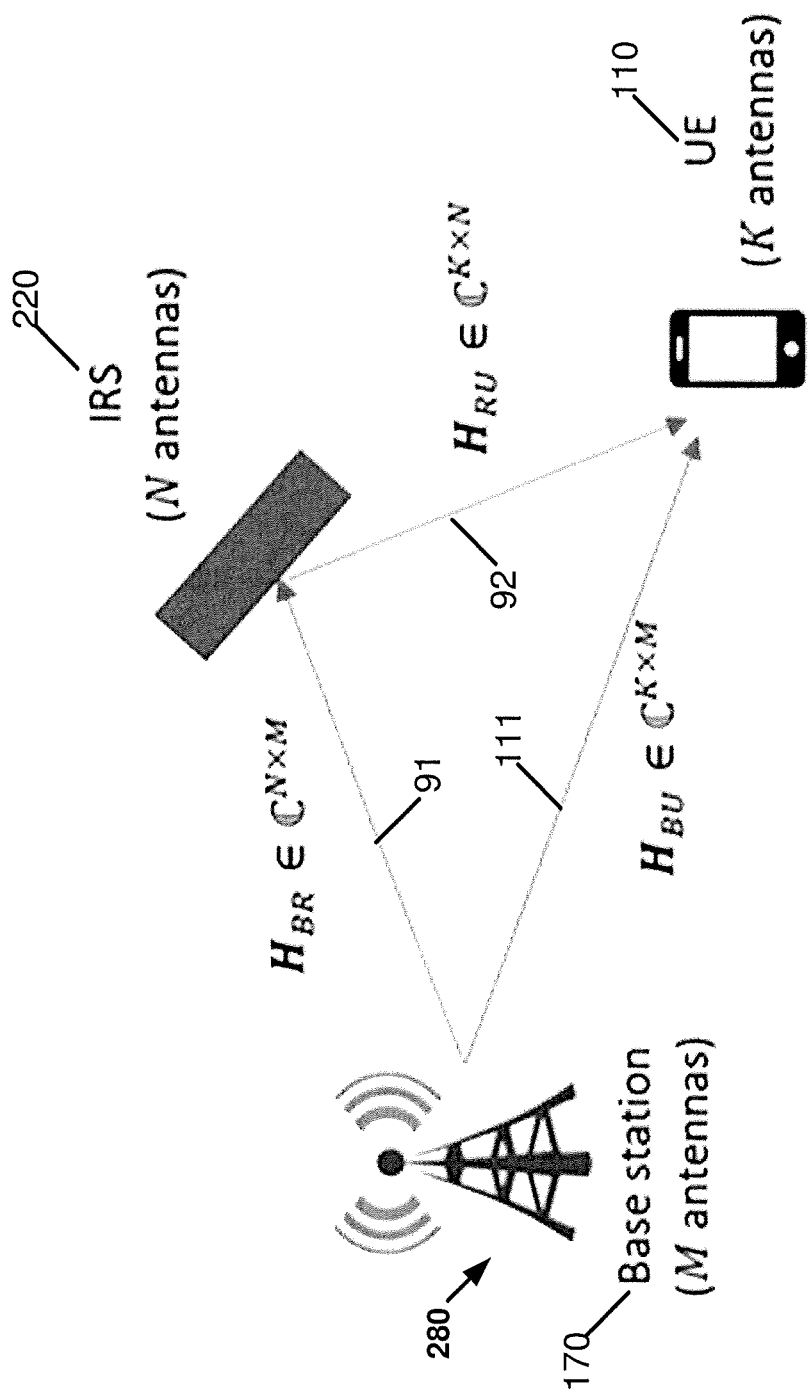
FIG. 5 is an illustration of an exemplary system model in accordance with an exemplary embodiment.

Concerning a system model, a system model composed of a base station 170, an IRS array 220, and a UE 110, as depicted in FIG. 5. We denote by M the number of antennas of the BS, by N those of the IRS, and by K those of the UE. Channels between BS and IRS, BS and UE, and IRS and UE, are denoted, respectively, by $H_{BR}$, $H_{BU}$, and $H_{RU}$. Each of these is an element of $\mathbb{C}^{K \times M}$. It should be noted that the IRS array 220 is one example and the primary example used herein. However, the instant techniques work with any reconfigurable reflecting surfaces, such as Intelligent Reflecting Surfaces (IRSs) and Large Intelligent Surfaces (LISs), and other such surfaces, some of which are described herein.

Figure 5A:
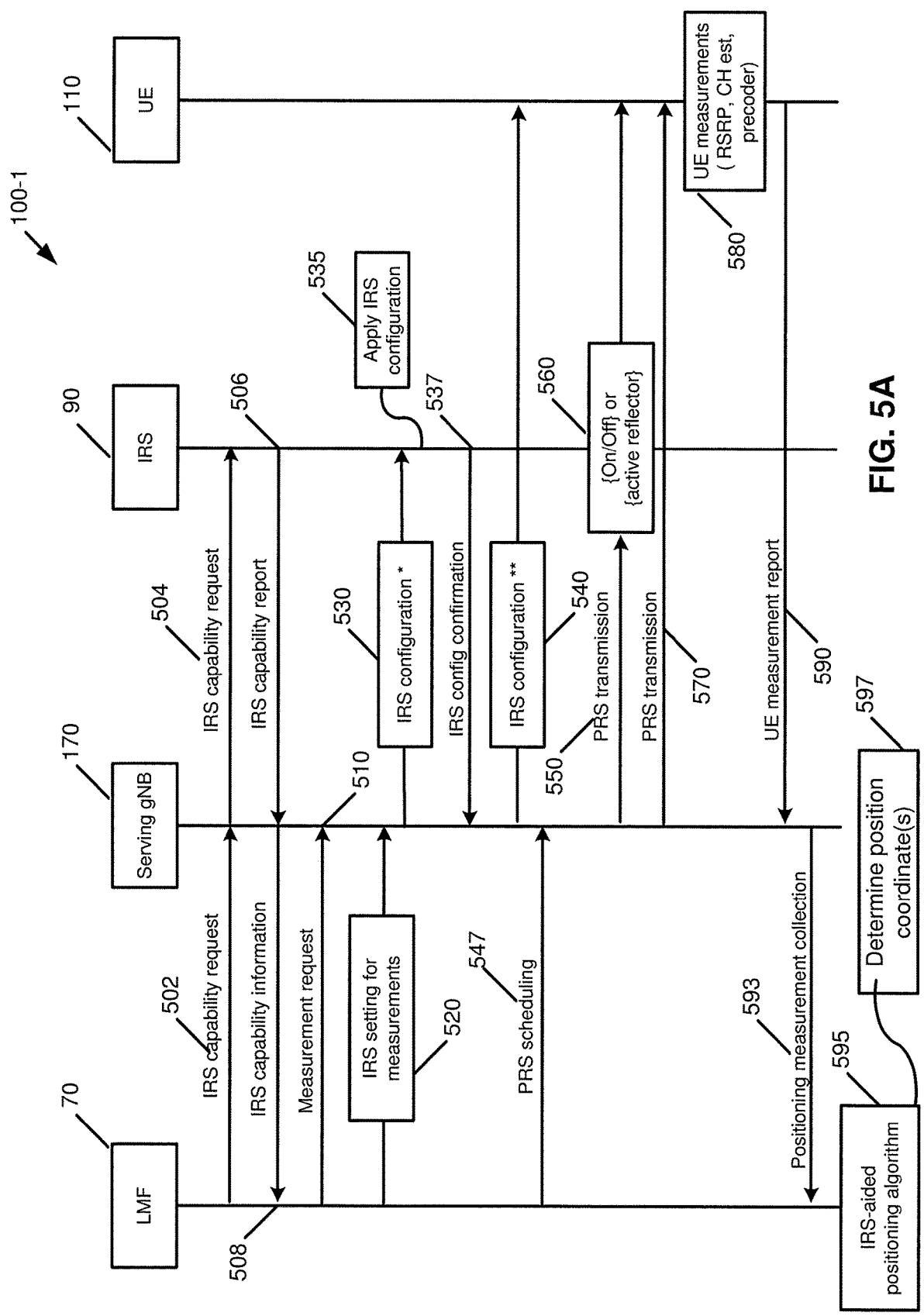
FIG. 5A is a signaling diagram for UE positioning aided by reconfigurable reflecting surfaces such as Intelligent Reflecting Surfaces (IRS), in accordance with an exemplary embodiment.

Turning to FIG. 5A, this figure is a signaling diagram for UE positioning aided by reconfigurable reflecting surfaces such as Intelligent Reflecting Surfaces (IRS). The entities in the signaling diagram are the following: a Location Management Function (LMF) 70 (e.g., implemented by a network node 190); a serving gNB 170, an IRS system 90, and a UE 110. The LMF 70 in this example performs the location management functions for the network 100-1. The functions performed by the respective entities would be performed by circuitry and/or software executed by circuitry, as described previously. It is noted that examples of the LMF include, as a network node 190, a computer or a server connecting to gNB 170.

As a general overview, it is possible for IRS capability, which may be used to control IRS properties by the LMF, can be reported to LMF through gNB before applying positioning schemes. This could be performed via an optional IRS capability request from LMF to gNB and from gNB to IRS, and a corresponding capability report from the IRS system 90. The gNB 170 sends out IRS configuration to the IRS system 90. After the IRS device receives the configurations, the IRS system 90 can report (e.g., configuration fail/success) its configuration confirmation to the gNB. For each IRS configuration, the gNB can trigger a UE measurement (e.g., ToA, AoA or RSPR). The gNB may repeat IRS configuration and UE measurement request to obtain multiple positioning measurements. It is noted that these configuration and measurement steps can be performed for each measurement, or it could be possible to send configuration for multiple measurements and the multiple measurements performed as per the configuration.

In FIG. 5A, the LMF sends an IRS capability request message in signaling 502. The serving gNB 170 passes this to the IRS system in signaling 504. In response, the IRS system sends an IRS capability report in signaling 506. For instance, it might be that the IRS system 90 only supports on/off, and this is what would be reported back. The IRS capability report could include indications of whether the IRS system 90 supports any one or more of IRS switching on/off, phase, group-delay or reflector amplitude as examples. Other examples are possible, such as sending a range of phase that is supported, or the like. The serving gNB 170 sends IRS capability information in signaling 508 to the LMF.

The LME 70 sends a measurement request 510 to the serving gNB 170. In signaling 520, the LMF 70 also sends an IRS setting for measurements to the serving gNB 170. This allows the serving gNB 170 to determine one or more IRS configurations, which the serving gNB 170 sends to the IRS system 90 in signaling 530.

IRS setting parameters in signaling 520 may include settings for IRS switching on/off, phase, group-delay or reflector amplitude as stated in embodiments below, and the corresponding IRS configuration sent in signaling 530 (and also 540, described below) may include any one or more of IRS switching on/off, phase, group-delay or reflector amplitude as examples. Regarding IRS switching on/off, IRS configuration for positioning measurement includes IRS modes making a near perfect signal reflection without reflection loss (switching on), also another mode absorbing reflecting signal energy (switching off). This definition of IRS on/off could, in certain cases, be also any other change in configuration. For instance, consider a random or systematic change to explore what is the effect of such a change and then determine the channel characteristics of the direct and the reflected path and separate the corresponding received signals.

In response to receiving the IRS configuration, the IRS system in block 535 applies the IRS configuration (e.g., or whatever part, if any, can be applied). The IRS system 90 sends an IRS configuration (config) confirmation in signaling 537, which may include whether the configuration was or was not applied, or what portion of the configuration was applied.

The serving gNB 170 also sends IRS configuration to the UE 110 in signaling 540. The IRS configuration can be performed by wireless channel, if the IRS system 90 is managed in an exemplary embodiment as a fixed anchor terminal. A new DCI/RRC can be assumed as IRS control signal 230 (e.g., in RAN2), in an exemplary embodiment. Also, if standardization manages IRS as a network device, the IRS configuration can be performed by wired chancel as well. LPP of the wired configuration can be defined to control IRS (e.g., in RAN3). The UE 110 can prepare based on indications in the signaling 540 to use the corresponding configuration of the IRS system 90 in order to take appropriate measurements. One possibility is that UE behavior is not changed due to IRS configuration in signaling 540. Other possibilities include that one can also consider UE measurement behaviors, e.g., with knowledge of IRS configuration, as further described below.

The LMF 70 sends a PRS scheduling request to the serving gNB via signaling 547. In signaling 550, the serving gNB 170 transmits Positioning Reference Signals (PRSs) to the IRS system 90, which turns the elements of the IRS array on or off or creates an active reflector (e.g., based on phase) with these elements. See block 560. The serving gNB sends a PRS transmission in signaling 570 to the UE 110. The UE makes one or more measurements, including one or more of RSRP, channel (CH) estimation (EST), and precoder information. The UE sends one or more measurement reports, including indications of any of the measurement information to the serving gNB, in signaling 590. The serving gNB sends a positioning measurement collection (e.g., at least for this UE 110) to the LMF 70 in signaling 593. The LMF 70 uses the position measurement collection to perform an IRS-aided positioning algorithm in block 595. One example of the IRS-aided positioning algorithm determines one or more position coordinates (see block 597) corresponding to the UE 110 through techniques such as those described below. It should be noted that this is performed with knowledge of a location of the reconfigurable reflecting surface (e.g., IRS 220 and/or its system 90).

In FIG. 5A, there are the possibilities of different IRS configurations (block 530, 540), different types of PRS transmissions (signaling 550, 560) and corresponding types of IRS configurations (block 560), and different possible UE measurements (block 580). There are multiple options for these, and an introduction to the types of options for types of IRS configurations (block 560), and different possible UE measurements (block 580) is now presented.

Figure 6:
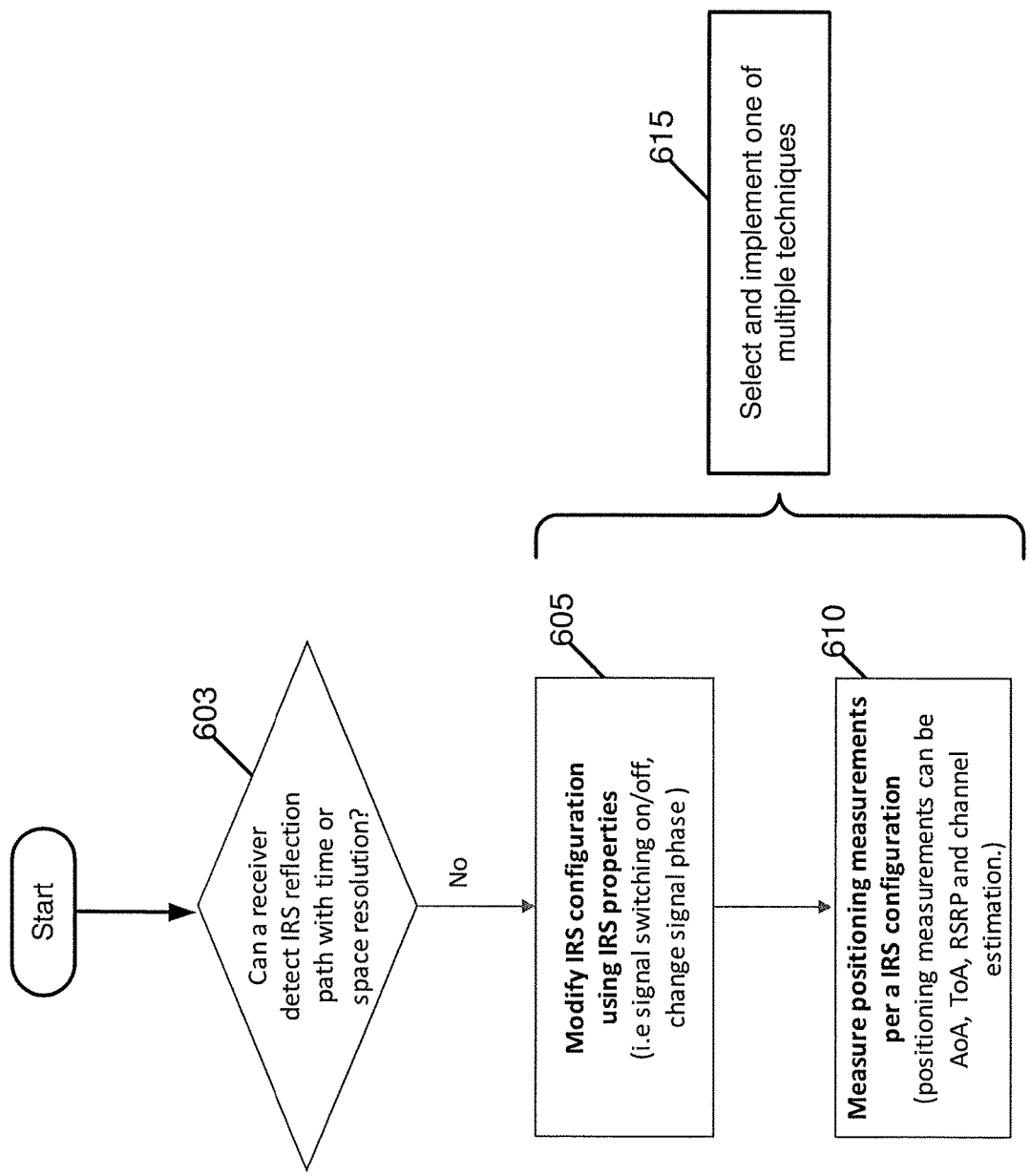
FIG. 6 is a block diagram of a method for IRS-aided positioning in accordance with exemplary embodiments herein.

Turning to FIG. 6, this figure is a block diagram of a method for IRS-aided positioning in accordance with exemplary embodiments herein. FIG. 6 is performed by a UE 110 and illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 would be controlled using the control module 140, at least in part. FIG. 6 illustrates exemplary differences as compared to FIG. 2A.

In block 603, a UE determines if a receiver can detect an IRS reflection path with time or space resolution. Note that this is different from block 240 of FIG. 2A, where the UE determines if a receiver can detect an IRS reflection with time AND space resolution. Also, note that the terms "reflection path" and "reflected path" are considered to be interchangeable. Note that a block such as block 250 could be added if block 603 is Yes, but is not shown. If the receiver cannot detect an IRS reflection path with time or space resolution (block 603=No), block 605 is performed, where the UE 110 modifies IRS configuration using IRS properties. Such properties may include one or more of signal switching on/off, signal phase, group delay or signal amplitude. Signal phase is the signal modified by $e^{-j\theta}$, where $-2\pi<\theta<2\pi$. Group delay is the reflected signal delay (i.e., nano/micro second signal delay). Amplitude is $\alpha S$, where S is the signal and $0<\alpha<1$. As indicated in FIG. 5A, the UE 100 receives indications of the IRS configuration in signaling 540. In block 610, the UE 110 performs positioning measurements per the IRS configuration. As examples, the positioning measurements can include AoA, ToA, RSRP, and channel estimation, or some combination of these.

Blocks 605 and 610 may be consolidated into a single block 615, where the UE selects and implements one of multiple techniques to perform both blocks 605 and 610. Below are described multiple different concepts to implement these blocks, and FIG. 6A illustrates some, but not all, possible examples.

Figure 6A:
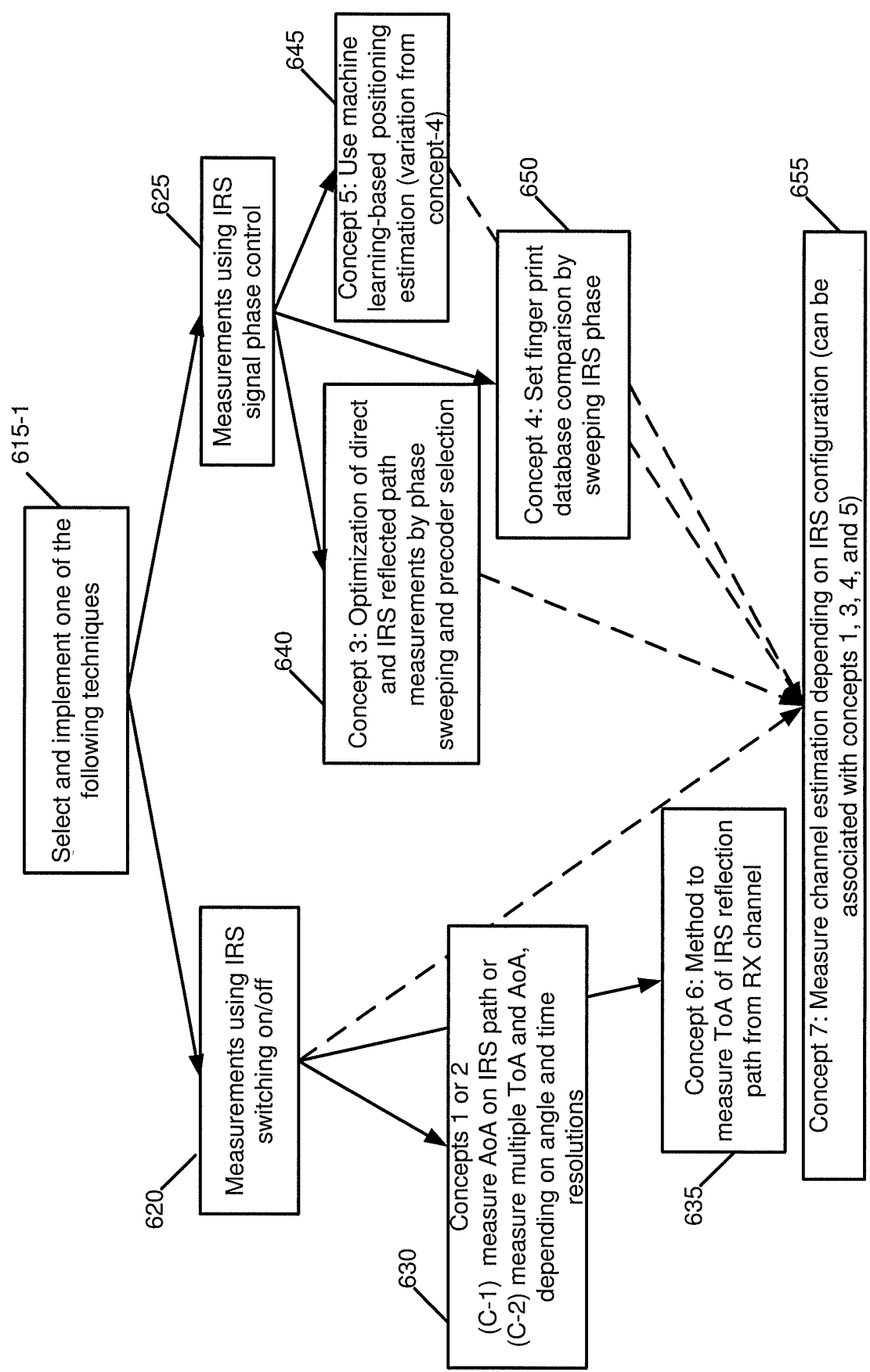
FIG. 6A illustrates part of the block diagram from FIG. 6.

FIG. 6A illustrates part of the block diagram from FIG. 6. One version of block 615 from FIG. 6 is illustrated in FIG. 6A as 615-1, where the UE selects and implements one of the following techniques. Note that this is an overview, and additional details for these techniques are presented below. Furthermore, while emphasis is placed on measurement techniques by the UE, some of the blocks in FIG. 6A also refer to operations performed by other elements, such as the LMF.

From block 615-1, there are two exemplary techniques: block 620, where measurements are performed using IRS switching on/off; and block 625, where measurements are performed using IRS signal phase control.

Under the technique of measurements being performed using IRS switching on/off (block 620) is the block 630, where concepts referred to herein as concepts 1 or 2 are performed. In concept 1 (C-1), the UE measures AoA on an IRS path. In concept 2 (C-2), the UE measures multiple ToA and AoA. The choice between C-1 or C-2 depends on angle and time resolutions. That is, first, angle resolution must be supported (applicable to both C-1 and C-2), then time-resolution can be applicable (applicable to C-2). Another possibility that uses the IRS switching on/off from block 620 is block 635, which is a concept (concept 6), which uses a method to measure ToA of an IRS reflection path from an RX channel.

Under block 625, where the UE 110 performs measurements using IRS signal phase control, are the following blocks: 640; 645; and 650. In block 640, which is an illustration of a concept referred to herein as concept 3, the UE performs optimization of direct and IRS reflected path measurements by taking measurements during phase sweeping and performing (e.g., optimal) precoder selection. In block 650, the UE (as a concept 4) helps to set a finger print database comparison by taking measurements during sweeping of IRS phase. Block 645 is an example of a concept 5, where machine learning-based positioning estimation is used, based on UE measurements. This is a variation from concept 4.

A seventh concept (concept 7) is illustrated in block 655, where the UE measures channel estimation depending on IRS configuration. This block can be associated with concepts 1, 3, 4, and 5.

Now that an overview has been provided, more detail is provided. Consider a case where the channels between the base station and UE, between base station and reflector (IRS array 220, or IRS 220 as a shortened version) and between the reflector and UE are single-path channels. The following description covers a case where the channels are single-path channels.

The signal received by the UE in downlink is the sum of a signal component received directly from the BS, and another signal component reflected through the IRS 220. Depending on whether the directed and reflected paths are resolvable or not by the UE receiver in the time domain, we distinguish two cases.

Case 1: a non-resolvable model (model 1) in the time domain (i e, direct and reflected paths are received at the same time $T_o$):

$$y(t)=(H_{BU}+H_{RU}\Theta H_{BR})Ws(t-\tau_0)+n(t), \quad (1)$$

where n(t) is time-varying noise, and $s(t-\tau_0)$ is described below.

Case 2: a resolvable model (model 2) in the time domain (i.e., direct and reflected paths are received at separate times $\tau_o$ and $\tau_1$):

$$y(t)=H_{BU}Ws(t-\tau_0)+H_{RU}\Theta H_{BR}Ws(t-\tau_1)+n(t), \quad (2)$$

In the above equations, $s \in \mathbb{C}^{L \times 1}$ is the transmitted signal of rank L≥1, $W \in \mathbb{C}^{M \times L}$ is the transmit precoding matrix, and $\Theta = \text{diag}(e^{j\Theta_1}, \ldots, e^{j\Theta_N}) \in \mathbb{C}^{N \times N}$ is a matrix representing the phase shifts applied by the IRS.

As explained previously, time-domain resolvability depends on the physical delay between the two paths (which in turn depends on the system geometry) and on the system bandwidth (the larger the bandwidth, the finer the delay resolution capability).

In addition to the times of arrival (ToA) $\tau_0$ and $\tau_1$, the received signal components of the direct path and the reflected path are also characterized by an angle of arrival (AoA), which we denote, respectively, as $\alpha_0$ and $\alpha_1$. Similar to what discussed on time-domain resolvability, the two paths may be resolvable or non-resolvable in the angular domain as well. The angular resolution capability depends on the specific algorithm used by the receiver for AoA estimation (e.g., beam sweeping, MUSIC, ESPRIT, etc.).

In a first embodiment (concept 1 of block 630 of FIG. 6A), a procedure for the identification of the ToA $\tau_1$ and AoA $\alpha_1$ of the IRS (reflected) path is defined. The procedure may include the following:

a) The IRS is sequentially turned ON and OFF according to a predefined protocol and signaling scheme. Note that in case of completely passive IRS, "turning OFF" may be implemented in practice by choosing $\Theta$ so as to minimize (ideally, set to zero) the received power of the reflected path. That is W should be orthogonal to $H_{RU}\Theta H_{BR}$.

b) The UE compares the channel impulse response estimated when IRS is ON/OFF and thereby identifies the corresponding reflected path and its delay $\tau_1$. For instance, the UE subtracts the received signal with IRS OFF from the received signal with IRS ON. The difference signal is the signal reflected from the IRS.

c) The UE estimates the AoA of the received signal (e.g., by MUSIC/ESPRIT) when IRS is ON/OFF and thereby identifies the AoA of the reflected path $\alpha_1$.

Based on the results of the ToA/AoA identification procedure, the two paths may be resolvable in time domain (if $\tau_1 \neq \tau_0$) and/or in the angular domain (if $\alpha_1 \neq \alpha_0$). In other words, through steps (a)~(c), the UE can figure out whether this statement is true or not. Therefore, this is a consequence of steps (a)~(c).

In a second embodiment (concept 2 of block 630 of FIG. 6A), after completion of the ToA/AoA identification procedure, the UE signals the number of available ToA and AoA measurements to the BS, or to another network entity called a "location management function (LMF)" (e.g., see LMF 70 of FIG. 5A). These measurements are used to enhance OTDOA or UTDOA based positioning algorithms Note that, in absence of IRS, only up to 1 ToA and 1 AoA measurement is available for each BS-UE link. Therefore, introduction of the IRS allows to have up to 2 additional measurements per link. This is beneficial for the positioning accuracy.

The table (Table 2) below summarizes the four possible combinations of ToA and AoA measurements.

|  | AoA resolvable ($\alpha_1 \neq \alpha_0$) | AoA not resolvable ($\alpha_1 = \alpha_0$) |
| --- | --- | --- |
| ToA resolvable ($\tau_1 \neq \tau_0$) | 2 AoA, 2 ToA | 1 AoA, 2 ToA |
| ToA not resolvable ($\tau_1 = \tau_0$) | 2 AoA, 1 ToA | 1 AoA, 1 ToA |

In a third embodiment (concept 3, block 640 of FIG. 6A), if the ToA is resolvable (model 2), we note that $\Theta$, W might not be able to be optimized to maximize both the received power of the direct path and that of the reflected path at the same time. Thus, we propose the following procedures.

Exemplary procedure (a). Consider separate optimization of direct and reflected path measurements. According to this procedure, first W is optimized by the UE so as to maximize $\|H_{BU}W\|^2$ and ToA and AoA are measured relative to the direct path. As should be apparent, the optimization has dependency on IRS configuration. Then, $\Theta$, W are optimized so as to maximize $\|H_{RU}\Theta H_{BR}W\|^2$ and ToA and AoA are measured relative to the reflected path. The first optimization can be simply solved by $$W = \frac{H_{BU}^H}{\|H_{BU}\|}.$$

Even if the second optimization problem is non-convex, this problem can be solved by the UE by computing the optimal $\Theta^*$ that maximizes $\|H_{RU}\Theta H_{BR}\|^2$ and then computing $$W = \frac{(H_{RU}\Theta^* H_{BR})^H}{\|H_{RU}\Theta^* H_{BR}\|}.$$

The optimization of $\|H_{RU} \Theta H_{BR}\|^2$ with respect to $\Theta$ can be solved using classic optimization methods such as the semi-definite relaxation and random projection techniques. For the latter, see reference (10), Ma, W. K. K., "Semidefinite relaxation of quadratic optimization problems and applications" IEEE Signal Processing Magazine, 1053 (5888/10) (2010). To solve the semidefinite relaxation classical approaches based on Lagrangian duality, gradient-descent algorithms, interior point methods or more recent techniques like the alternating direction method of multipliers can be used. See reference (11), Boyd, S. and Vandenberghe, L., "Convex optimization", Cambridge University Press (2004). One possible drawback of this method is that it introduces latency and additional signaling.

Exemplary procedure (b). Consider now joint optimization (e.g., trade-off) performed by the UE of direct and reflected path measurements. According to this exemplary procedure, W, which is determined in part by IRS configuration, is optimized in one shot. This finds a trade-off between optimization of direct and reflected path. It is possible to formulate the optimization problem as $$\operatorname*{argmax}_{\Theta, W}(1-\gamma)\|H_{BU}W\|^2 + \gamma\|H_{RU}\Theta H_{BR}W\|^2,$$

where $\gamma\in[0,1]$ determines the relative weights of the two paths. This optimization problem is a non-convex problem, but this problem can be solved by initially computing the optimal $\Theta^*$ that maximizes $\|H_{RU}\Theta H_{BR}\|^2$ and then solving the reduced optimization problem $$\operatorname*{argmax}_{W}(1-\gamma)\|H_{BU}W\|^2 + \gamma\|H_{RU}\Theta^* H_{BR}W\|^2,$$

which is convex (sum of two convex functions). Like for the procedure (a), optimization techniques such as semidefinite relaxation classical approaches based on Lagrangian duality, gradient-descent algorithms, interior point methods or ADMM can be used (see reference (11)) can be used for solving the problem. This second procedure (b) has a benefit of reduced latency and signaling compared to procedure (a).

In a fourth embodiment, a procedure is proposed for IRS-enabled fingerprinting. This is concept 4 in block 650 of FIG. 6A. The procedure may work as follows in one exemplary embodiment.

a) Database construction (which means performing training by a network node such as the LMF with known UE positions) may be performed via the following.

i) The IRS sweeps the phases $\Theta$ according to a pre-defined pattern.

Possible choices for the pattern include the following: linear phase increase of all phases by a step $\Delta$; pseudo-random phase sequence; and the like.

ii) For each $\Theta$, an optimal precoding matrix W is computed by the UE as per the following.

1) In the case of a superposition model (model 1), $$W_{opt}(\Theta) = \operatorname*{argmax}_{W}\|(H_{BU} + H_{RU}\Theta H_{BR})W\|^2 = \frac{(H_{BU} + H_{RU}\Theta H_{BR})^H}{\|H_{BU} + H_{RU}\Theta H_{BR}\|}.$$

2) In the case of a resolvable model (model 2), the optimal W may be computed similarly as in point 4(b), i.e., $$W_{opt}(\Theta) = \operatorname*{argmax}_{W}(1-\gamma)\|H_{BU}W\|^2 + \gamma\|H_{RU}\Theta H_{BR}W\|^2,$$

where $\gamma\in[0,1]$.

iii) A database is constructed (e.g., by a network node such as the LMF) by using received measurements of the received power (e.g., RSRP) at the UEs (assuming known location) for each value of $\Theta$. That is, entries in the database consist of tuples $\{x, r, \Theta\}$, where x is the position and r is the measured RSRP.

b) Next, consider positioning (which entails estimation of unknown UE position), which may be performed by a network node such as the LMF via the following.

i) IRS sweeps $\Theta$ like in (a)(i) of the database construction, described above.

ii) The UE measures RSRP r for each $\Theta$. As previously described, these measurements have dependency on the IRS configuration. The UE sends these measurements to the network node.

iii) The received and measured $\{r, \Theta\}$ are compared, e.g., by a network node such as the LMF, against the tuples $\{x, r, \Theta\}$, in the database, and the tuple with the closest match of $\{r, \Theta\}$ is selected. As an example, the match between measurement and database may be established by distance functions, e.g., $d(\{r_{meas}, \Theta_{meas}\}, \{r_{DB}, \Theta_{DB}\}) = \Sigma_{i\in\{\Theta_{meas}, \Theta_{DB}\}} w_i |r_{meas,i} - r_{DB,i}|$.

iv) The UE position estimate by, e.g., the LMF, is the x from the selected tuple.

In a fifth embodiment (concept 5 from block 645 of FIG. 6A), a procedure is proposed for IRS-enabled fingerprinting with machine learning. This procedure works like the fourth embodiment, except that the match between measurements and database is established by machine learning techniques. More specifically, one exemplary model that may be used to describe the relationship between the IRS-assisted measurements and the UE position is a Deep Neural Network (DNN), although other types of neural networks may be used.

Figure 7:
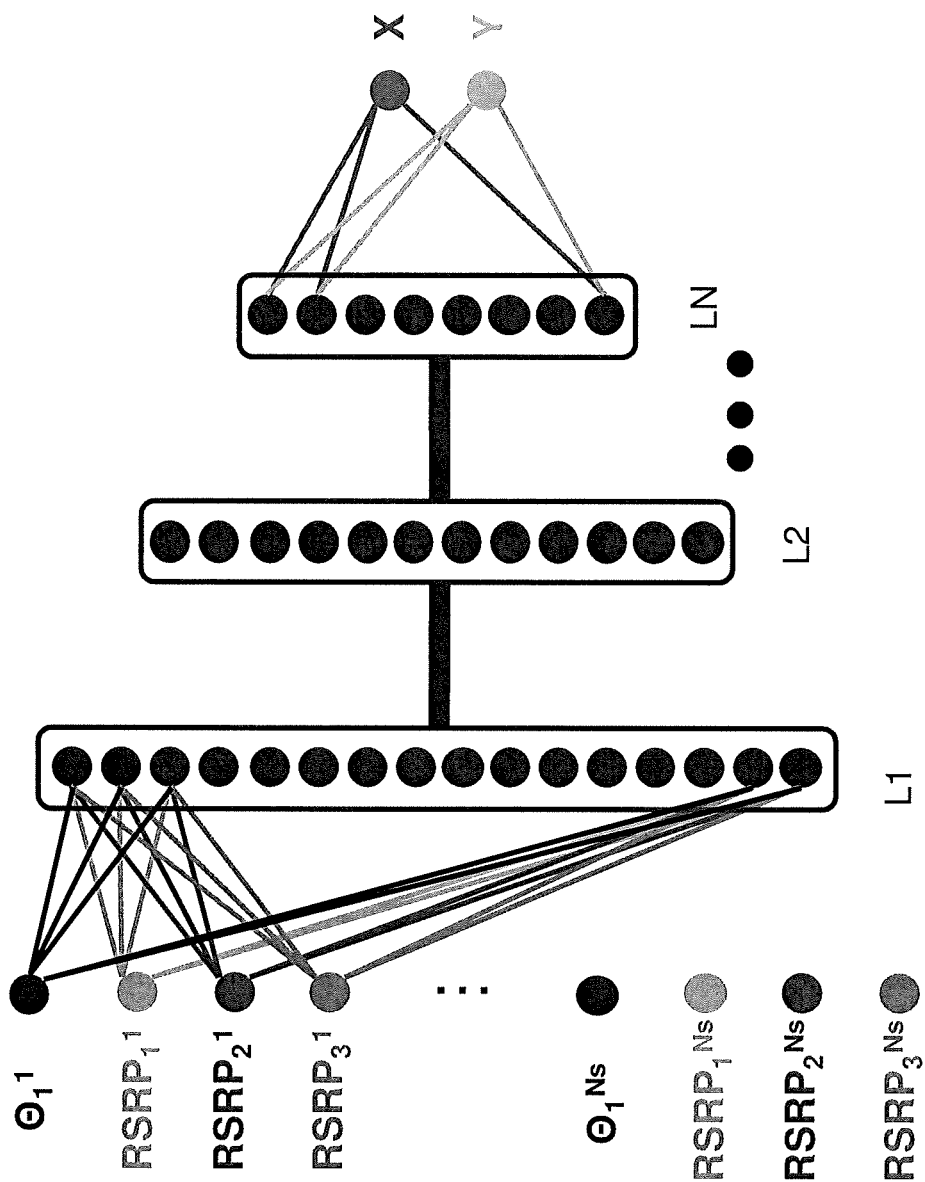
FIG. 7 illustrates an example of a DNN used for IRS-enabled fingerprinting, in accordance with an exemplary embodiment.

The DNN is composed of L layers, $s_l$ number of units in layer $l\in L$, N inputs, and O outputs. The DNN outputs a probability distribution over the test points. The N inputs correspond to RSRPs and corresponding $\Theta$ values whereas the output corresponds to the coordinates x and y. See FIG. 7, which illustrates an example of a DNN used for IRS-enabled fingerprinting, in accordance with an exemplary embodiment. Layers [L1, L2, . . . , LN] are shown and the first layer has inputs of $N_S$ $\Theta_1$ values and $N_S$ values of $RSRP_1$, $RSRP_2$, and $RSRP_3$ in this example. The outputs are the coordinates x and y.

The procedure may be implemented as follows.

a) Database construction (which is performed by a network node such as the LMF via training with known UE positions) is performed using the following.

i) The IRS sweeps the phases Θ according to a pre-defined pattern. Possible choices for the pattern include the following: linear phase increase of all phases by a step Δ; pseudo-random phase sequence; and the like.

ii) For each Θ, an optimal precoding matrix W is computed by the UE as per the following in one example. As previously described, the optimization has dependency on IRS configuration.

1) In the case of a superposition model (model 1), $$W_{opt}(\Theta) = \underset{W}{\mathrm{argmax}} \|(H_{BU} + H_{RU}\Theta H_{BR})W\|^2 = \frac{(H_{BU} + H_{RU}\Theta H_{BR})^H}{\|H_{BU} + H_{RU}\Theta H_{BR}\|}.$$

2) In the case of a resolvable model (model 2), the optimal W may be computed similarly as in point 4(b), i.e., $$W_{opt}(\Theta) = \underset{W}{\mathrm{argmax}}(1-\gamma)\|H_{BU}W\|^2 + \gamma\|H_{RU}\Theta H_{BR}W\|^2,$$

where $\gamma \in [0,1]$.

iii) A database is constructed, e.g., by a network node such as the LMF, by measuring the received power (e.g., RSRP) at the UEs (assuming known location) for each value of Θ. That is, entries in the database comprise tuples $\{(x, y), r, \Theta\}$, where $(x, y)$ is the position coordination, and r is the measured RSRP.

iv) A DNN (implemented by a network node such as the LMF) with L layers, $s_l$ number of units in layer l∈L, N inputs (N equal to the cardinality of the tuple $\{r, \Theta\}$), and O=2 outputs (the coordinate x and y) is trained using the measurements in the database. The training phase provides the weights of the DNN.

b) Positioning (which provides estimation of unknown UE position) is performed by the, e.g., LMF in an exemplary embodiment as follows.

i) Perform IRS sweeps Θ like in in (a)(i) of the database construction, described above.

ii) The UE measures RSRP r for each Θ. The UE sends the measurements to the, e.g., LMF.

iii) The measured $\{r, \Theta\}$ are provided by the, e.g., LMF as input to the DNN, which provides a prediction of the position $(x, y)$.

In a sixth embodiment (concept 6, block 635 of FIG. 6A), a procedure is proposed for ToA measurement using IRS based on Case 2 (i.e., resolvable model in the time domain). This exemplary procedure may work as follows.

a) The gNB controls IRS off, and a UE receives a signal transmitted from a serving cell as the following:

$$y_{sv}(t) = H_{BU}Ws(t-\tau_0) + n(t),$$

where the variables have been previously defined.

1) A UE measures $ToA_{sv}$ on signal $y_{sv}(t)$, and reports it to LMF (or another network node, as appropriate).

2) A UE stores the RX samples of $y_{sv}(t)$ in a buffer.

b) The gNB controls IRS on, and a UE receives a signal from both the gNB and IRS as in Equation (2).

c) A UE constructs a signal transmitted only from IRS as the following:

$$\hat{y}_{IRS}(t) = y(t) - y_{sv}(t), \quad (3)$$

where $y_{sv}(t)$ has been described above. A UE measures $ToA_{IRS}$ on signal $\hat{y}_{IRS}(t)$ and reports it to LMF (or another suitable network node).

In a seventh embodiment (see block 655 of FIG. 6A), this considers an extension to the case where the channels between base station and UE, between base station and reflector (e.g., IRS 220) and between reflector and UE are multi-path channels. The following material therefore concerns multi-path channels.

Each element of the reflective surface comprises a transmit and receive antenna, a wireless receiver and a wireless transmitter. Between receiving and transmitting, the signal is either convolved with a time dependent impulse response or transformed into the frequency domain, multiplied by a frequency response and transformed back into the time domain. In an OFDM system, the transforms can be done per symbol using a cyclic prefix. This embodiment allows the IRS to be configured for reflecting the signals with a phase that is an arbitrary function of the frequency, including a phase that is independent of frequency which may not be realizable with passive IRS. By configuring a linear phase (as a function of frequency), the signal can be shifted in time. This can be used to make the direct and the reflected signal distinguishable in time.

The methods can be extended to the case where the channels are multipath channels and the IRS reflects with a frequency dependent phase rotation. In the frequency domain the received signal can be written as the following:

$$Y(f) = (H_{BU}(f) + H_{RU}(f)\Theta(f)H_{BR}(f))W(f) + N(f),$$

as in case 1 and as the following:

$$Y(f) = H_{BU}(f)W(f) + H_{RU}(f)\Theta(f)H_{BR}(f)W(f) + N(f),$$

as in case 2, where $\Theta = \mathrm{diag}(e^{j\theta_1(f)}, \ldots e^{j\theta_N(f)}) \in \mathbb{C}^{N \times N}$. The procedures for determining Θ and W can be defined similar as above with the additional dimension of the frequency represented, e.g., by a finite number of sub-bands in which the phase is approximately constant.

In terms of channel measurements, the above methods, for extension to the case where the channels are multipath channels and the IRS reflects with a frequency dependent phase rotation, should provide knowledge of the channel matrices $H_{BU}$, $H_{BR}$ and $H_{RU}$. $H_{BU}$ can be measured by transmitting pilot signals and switching the IRS off. The product $H_{RU} \cdot H_{BR}$ can be measured by transmitting pilot signals, subtracting the received signal with IRS OFF from the received signal with IRS ON and estimating the channel of the difference signal using the concept-1 and concept-2. The matrix Θ and precoder for $H_{RU}$ and $H_{BR}$ can be optimized by concept 5 optionally. The channels $H_{RU}$ and $H_{BR}$ can then be determined by a singular value decomposition (SVD) of the measured product. In the case where the channels are frequency dependent, the procedures must be repeated for several frequency sub-bands.

A procedure for determining the channel matrices can be described as follows.

The matrix $H_{BU}(f) + H_{RU}(f)\Theta(f) H_{BR}(f)$ of the channel covering both the direct and the reflected path is measured by transmitting pilots $P_m$ from antenna m at the base station and receiving the signal $$Y(f) = (H_{BU}(f) + H_{RU}(f)\Theta(f)H_{BR}(f))P_m(f),$$

at antenna n at the UE. Here the noise has been ignored for simplicity. In general, Y(f) and $P_m(f)$ are complex vector-valued functions of the frequency. $P_m$ is a vector where only element m is nonzero. By repeating this for all transmit and receive antennas, the complete channel matrix can be measured. The pilots from different antennas can be transmitted at the same time, if they are orthogonal, e.g., in the frequency domain.

In the next step, the reflected path is separated. For this, a first measurement is performed with $\Theta_0(f)$ and a second measurement with $\Theta_1(f)$. The two measurements are performed within the coherence time of the channel, so that the channel does not change significantly between the measurements. By subtracting the second receive signal from the first, the following may be obtained:

$$Y_0(f)-Y_1(f)=H_{RU}(f)(\Theta_0(f)-\Theta_1(f))H_{BR}(f)P_m(f).$$

The matrices $\Theta_0(f)$ and $\Theta_1(f)$ are chosen in such a way that they differ just in the lth diagonal element. In the difference matrix $\Theta_0(f)-\Theta_1(f)$, all other diagonal and non-diagonal elements are then zero. The difference of the received signals can then be written as the following scalar equation:

$$Y_0(f)-Y_1(f)=H_{RU,l}(f)\Theta_l(f)H_{BR,l}{}^H(f)P_m(f),$$

where $H_{RU,l}$ is the lth column vector of $H_{RU}$, $H_{BR,l}{}^H$ is the lth row vector of $H_{BR}$ and $\Theta_l$ is the known lth diagonal element of the difference $\Theta_0(f)-\Theta_1(f)$.

For known receive signals and pilots and by repeating the procedure for each transmit antenna m, the channel matrix $H_{RU,l}(f)\Theta_l(f)+H_{BR,l}{}^H(f)$ can be estimated. A singular value decomposition (SVD) is then performed of this rank-1 matrix. It yields vectors $U_l$ and $V_l$ and a scalar $\Sigma_l$ such that $$H_{RU,l}(f)\Theta_l(f)H_{BR,l}{}^H(f)=U_l(f)\Sigma_l(f)V_l{}^H(f).$$

By doing this, we can identify the channel vectors except for one complex factor. And by repeating for all l elements, we can identify the channel matrices $H_{RU}$ and $H_{BR}$ except for the corresponding factors. In reality, when noise is present, the matrix will be only approximately rank-1; hence, the SVD will not yield a single singular value, but rather $\Sigma_l$ will be a full rank matrix with one meaningful singular value and all others approximately zero. So, we will ignore the singular values below a certain threshold, and the corresponding singular vectors.

The remaining problem is to define the unknown factors. For this we need to compare measurements where only one antenna element at the BS is transmitting at a time and one element of the IRS is modified. These measurements have already been performed in the previous steps. By calculating the differences described above we obtain a first receive vector for one transmit antenna and a second receive vector for a second transmit antenna. The two receive vectors contain the relative amplitude and phase factors between receive antennas at the UE. By dividing elements of one receive vector pairwise, we obtain these relative factors. Since ideally the results should be the same for receive vectors from different transmit antennas, they can be averaged over the receive vectors corresponding to the different transmit antennas for reducing the impact of noise. By dividing the two receive vectors elementwise, we obtain the relative amplitude and phase factors between the two transmit antennas at the BS. In practice, the result will be different for each element of the result vector due to noise. In that case we can use the average of the results as the relative amplitude and phase factor between the two transmit antennas. The procedure is repeated several times, e.g., for each transmit antenna relative to the first transmit antenna. All missing factors are now known except for one complex factor for the overall channel (same factor for all pairs of transmit and receive antennas). This factor is not relevant for the proposed procedures.

The following description concerns multiple examples of implementations. Implementations rely on the installation of one or more IRS/LIS in the environment where the network is deployed, and where positioning will be performed. Appropriate signaling should be defined as well to support the use of IRS in the NR standards. This includes the following examples: a protocol to switch the IRS on/off; signaling for the UE to report the number of resolvable AoA/ToA's to the BS/LMF; a procedure for IRS-enabled fingerprinting.

Figure 8:
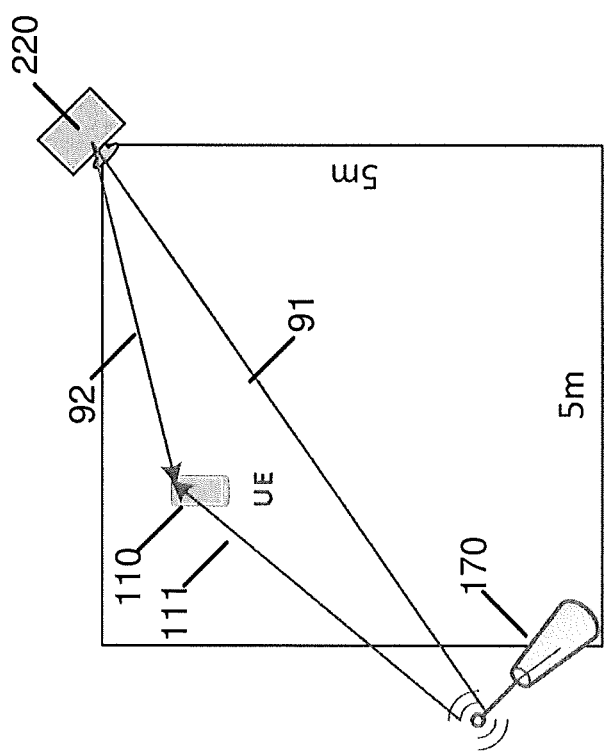
FIG. 8 illustrates a test scenario installed a gNB at one corner and an IRS panel in the opposite corner in a 5 m×5 m room space, in accordance with an exemplary embodiment.

In order verify the positioning concept, the inventors implemented an indoor scenario with an IRS panel installation. The test scenario installed a gNB 170 at one corner and an IRS panel 220 in the opposite corner in a 5 m×5 m room space. See FIG. 8.

A ray-tracing channel is investigated in the space per a 50 cm grid between the base station and IRS in the space. Rays are combined at measurement points from the base station and from the IRS reflection. The ray propagation model is adapted from the following reference, reference (12), Xuhong Li, "MS thesis, efficient ray tracing simulation," Lund University and Forschungszentrum Telekommunikation Wien GmbH (2014). A 28 GHz sinusoidal wave is assumed to be transmitted through a wide beam, also the signal is reflected by IRS at the same time. In references (5) to (9), properties of IRS reflection have been discussed. In this test, we assume a near perfect reflection which preserves most of signal energy without amplitude attenuation at IRS reflection, and the phase of the reflected signal can be rotated due to the reflection.

Figure 9:
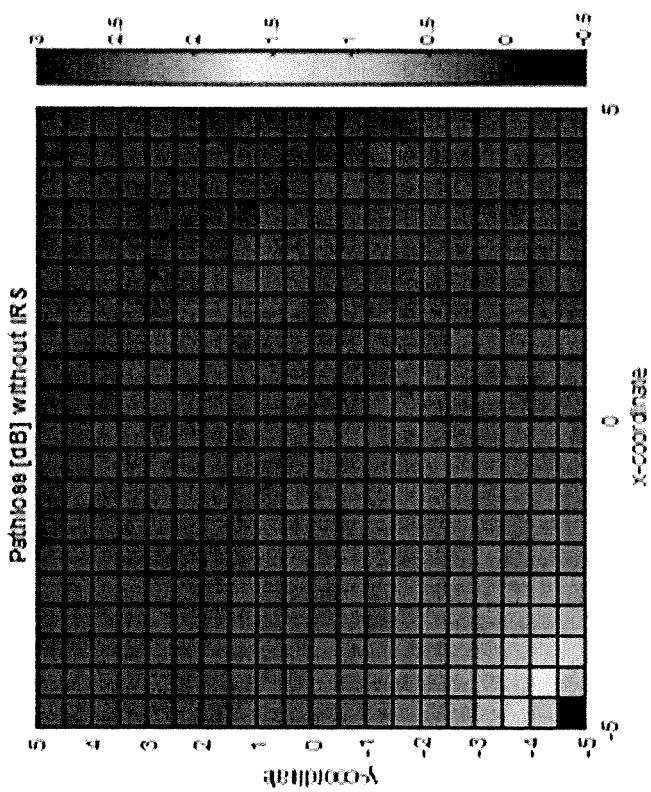
FIG. 9 is a diagram of pathloss [in dB] measurement without IRS deployment, where it is seen that pathloss appears monotonously over the space.
Figures 10A, 10B:
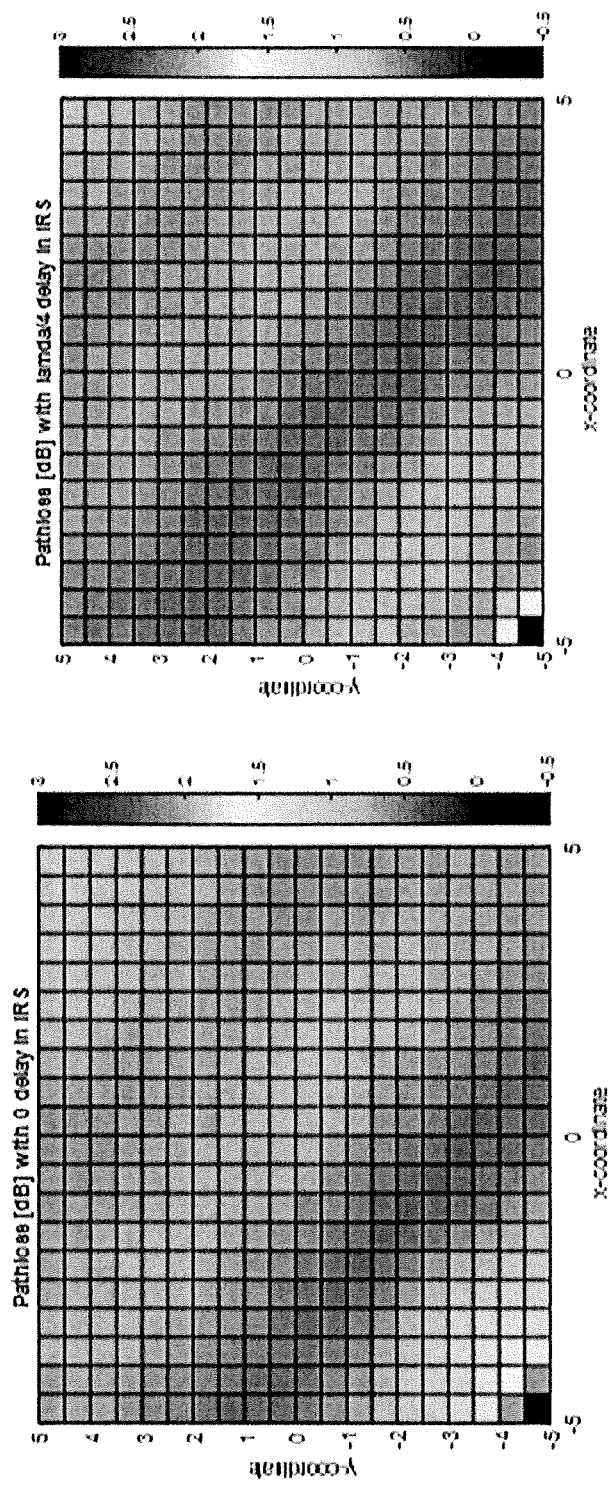
FIGS. 10A, 10B, 10C, and 10D illustrate pathloss [dB] measurement with IRS phase control, where
Figure 10D:
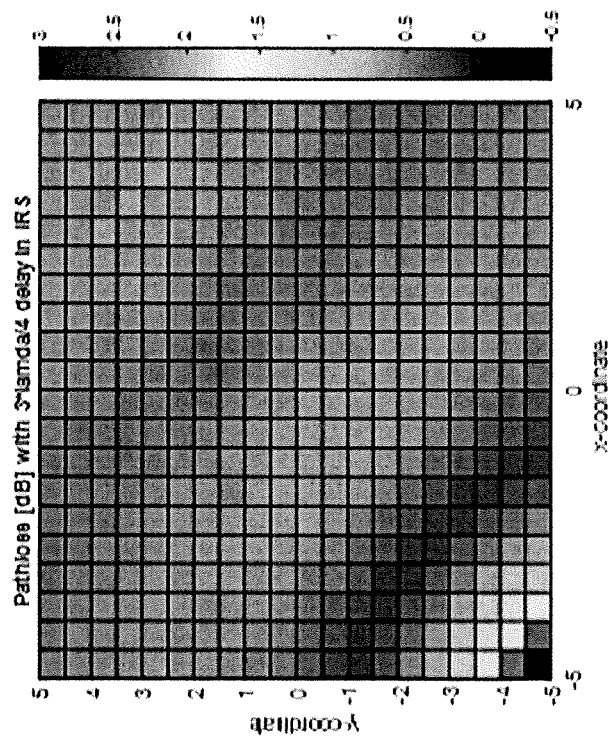
Figure 10C:
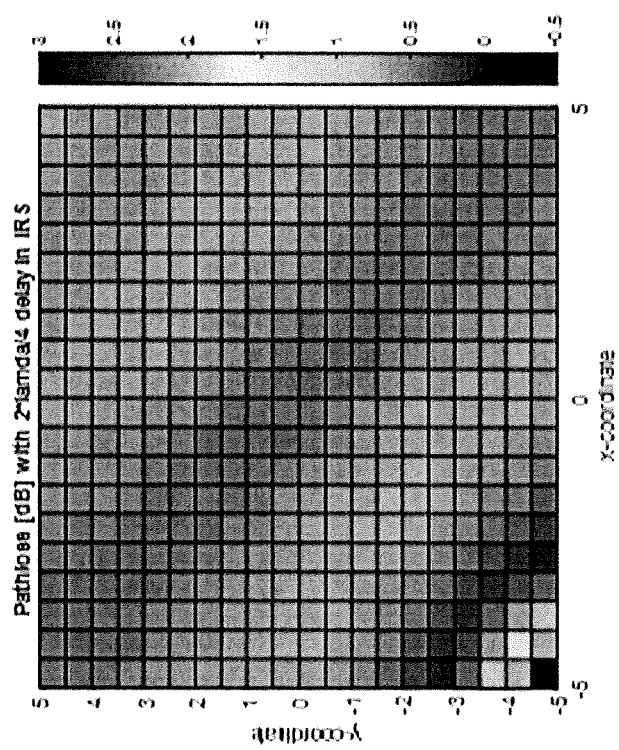

FIG. 9 is a diagram of pathloss [in dB] measurement without IRS deployment, where it is seen that pathloss appears monotonously over the space. The B indicates where the gNB 170 is placed. FIGS. 10A, 10B, 10C, and 10D illustrate pathloss [dB] measurement with IRS phase control, where FIG. 10A illustrates zero delay, FIG. 10B illustrates λ/4 delay, FIG. 10C illustrates 2λ/4 delay, and FIG. 10D illustrates 3λ/4 delay, and where λ is a wave length, B is base station, and I is IRS in the figures.

RX power measurement (i.e. RSRP) is evaluated through pathloss investigation. FIG. 9 shows the pathloss measurements when there is only a BS transmission in the deployment. In these results, the propagation appears as a monotone function, since the reflection caused by the surrounding environment is negligible. If a beam is not capable to indicate peak direction, there is no further extra information (i.e., angle, multiple RSRP) in the single BS deployment. In FIGS. 10A-10D, an IRS 220 was added that can control signal group delay. The signal delay can be adjusted in the fourth embodiment described above. As giving a different delay by the IRS 220, pathloss measurement appears with multiple pattern depending on the group delay, since it superposes signals with different non-coherent signal phase. In other words, when TX signal is s(t), the IRS reflection signal is given as s(t−τ̃), where IRS control factor is delay as a portion of the wave length. Since it is time domain delay, the model expression in Equation (1) is valid in frequency domain with phase control Θ. Therefore, Θ is an important part obtaining such profiles of fingerprint data for positioning. By sweeping Θ, this measurement expansion from FIG. 9 to FIGS. 10A-10D can improve localization fingerprint search comparing to the monotone measurements in FIG. 9.

Without in any way limiting the scope, interpretation, or application of the claims appearing below, a technical effect and advantage of one or more of the example embodiments disclosed herein is that, unlike SLAM-based positioning approaches (see references (7)-(9)), exemplary embodiments herein rely on fixed and controllable devices (the IRS/LIS), installed on purpose in a specific environment to aid positioning. This guarantees the stationarity of the scattering environment and introduces an additional degree of freedom, i.e., the possibility of tuning the phases of the IRS.

Thanks to these properties, IRS-aided positioning can result in higher accuracy, reliability, and robustness compared to SLAM-based approaches. The proposed approach may require installation of ad-hoc hardware (i.e., the IRS/LIS). This is only feasible in certain scenarios, such as industrial facilities, offices, airports, shopping centers, etc., where accurate positioning is needed and the cost of installing and maintaining the IRS is justified.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AMF access and mobility management function
AoA angle of arrival
AoD angle of departure
BS base station
CU central unit
DCI downlink control information
DNN deep neural network
DU distributed unit
EM electromagnetic
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
ESPRIT Estimation of Signal Parameters via Rational Invariance Techniques
E-UTRA evolved universal terrestrial radio access, i.e., the LTE radio access technology
FFT fast Fourier transform
gNB (or gNodeB) base station for 5G/NR, i.e., a node providing NR user plane and control plane protocol terminations towards the UE, and connected via the NG interface to the 5GC
GNSS Global Navigation Satellite System
I/F interface
IRS Intelligent Reflective Surface
LIS Large Intelligent Surface
LMF location management function
LPP LTE Positioning Protocol
LTE long term evolution
LOS line of sight
MAC medium access control
MEMS micro-electromechanical systems
MME mobility management entity
MUSIC Multiple Signal Classification
ng or NG next generation
ng-eNB or NG-eNB next generation eNB
NR new radio
N/W or NW network
OFDM Orthogonal Frequency Division Multiplexing
OTDOA Observed Time Difference of Arrival
PDCP packet data convergence protocol
PHY physical layer
PRS positioning reference signals
RAN radio access network
RAT radio access technology
Rel release
RF radio frequency
RLC radio link control
RRC radio resource control
RRH remote radio head
RSRP Reference Signal Received Power
RU radio unit
Rx receiver
SDAP service data adaptation protocol
SGW serving gateway SLAM simultaneous localization and mapping
SMF session management function
SVD singular value decomposition
ToA time-of-arrival
TS technical specification
Tx transmitter
UE user equipment (e.g., a wireless, typically mobile device)
UPF user plane function
UTDOA Uplink Time Difference of Arrival
UWB ultra-wideband

What is claimed is:

1. An apparatus, comprising:
   at least one processor; and
   at least one non-transitory memory storing instructions that, when executed with the at least one processor, cause the apparatus to perform:
   sending, with a network node in a wireless network, a request of one or more settings useable with a reconfigurable reflecting surface for adjusting elements of the reconfigurable reflecting surface for one or more positioning reference signal transmissions from a base station toward a user equipment;
   receiving, with the network node, one or more measurements taken with the user equipment for the one or more positioning reference signal transmissions, wherein the one or more positioning reference signal transmissions have a direct path between the base station and the user equipment and a reflection path that reflects off the reconfigurable reflecting surface; and
   calculating, with the network node, a position coordinate corresponding to the user equipment using the one or more measurements with knowledge of a location of the reconfigurable reflecting surface;
   wherein the calculating further comprises performing the calculation using a database, the database comprising positioning of user equipment and corresponding measurements and corresponding settings applied with the reconfigurable reflecting surface, that was constructed prior to the sending, receiving, and calculating.

2. The apparatus of claim 1, wherein the calculating further comprises the network node performing a procedure for separating components from the direct path and the reflected path in the one or more measurement results provided by the user equipment.

3. The apparatus of claim 1, wherein the calculating further comprises the network node performing a procedure for extracting channel state information from the direct path and the reflected path in the one or more measurement results provided by the user equipment.

4. The apparatus of claim 1, wherein the network node comprises a location management function that performs at least the calculating, wherein the network node is one of separate from the base station or is the base station.

5. The apparatus of claim 1, wherein the request of one or more settings of the reconfigurable reflecting surface is to modify one or more properties of its elements for the corresponding one or more positioning reference signal transmissions, wherein the one or more properties comprise one or more of signal switching on or off, signal phase, group delay, or signal amplitude.

6. An apparatus, comprising:
   at least one processor; and
   at least one non-transitory memory storing instructions that, when executed with the at least one processor, cause the apparatus to perform:
   sending, with a base station in a wireless network and toward both a reconfigurable reflecting surface and a user equipment, a configuration usable with the reconfigurable reflecting surface for adjusting elements of the reconfigurable reflecting surface, the configuration to be used for one or more positioning reference signal transmissions from the base station toward the user equipment, wherein the one or more positioning reference signal transmissions have a direct path between the base station and the user equipment and a reflection path that reflects off the reconfigurable reflecting surface;
   sending, with the base station, a second configuration to the user equipment to cause the user equipment to perform one or more measurements for the one or more positioning reference signal transmissions;
   performing, with the base station, the one or more positioning reference signal transmissions with the user equipment; and
   receiving, with the base station, one or more measurement reports comprising indication of the one or more measurements;
   wherein the configuration comprises one or more of signal switching on or off, signal phase, group delay, or signal amplitude.

7. The apparatus of claim 6, wherein: sending the second configuration to the user equipment further comprises sending the second configuration requesting the user equipment to perform one or more of reference signal received power measurement, channel estimation measurement, or precoder information determination; and performing the one or more positioning reference signal transmissions with the user equipment further comprises sending, with the base station and toward the user equipment, positioning reference signals in the one or more positioning reference signal transmissions.

8. The apparatus of claim 7, wherein:
   sending the configuration to be applied with the reconfigurable reflecting surface to adjust elements of the surface comprises sending indication of a value for signal phase to be applied with the reconfigurable reflecting surface to adjust elements of the surface; and
   sending the second configuration to the user equipment further comprises sending the second configuration requesting the user equipment to measure one or more of precoder information or channel estimation.

9. The apparatus of claim 7, wherein the base station repeats the sending of the configuration with indications of multiple values of signal phase to obtain multiple measurements corresponding to the multiple values.

10. The apparatus of claim 6, wherein sending the configuration to be applied with the reconfigurable reflecting surface to adjust elements of the surface further comprises sending, with the base station via one or more of a wireless control channel, a wired control channel, or a dedicated channel, one or more setting parameters for adjusting the elements of the reconfigurable reflecting surface.

11. The apparatus of claim 10, wherein the one or more setting parameters comprise indications of one or more of signal switching on or off, signal phase, group delay, or signal amplitude.

12. The apparatus of claim 10, wherein the base station connects, using a positioning protocol, to the reconfigurable reflecting surface through radio resource control for a static control of the setting parameters, or through downlink control information for dynamic control of the setting parameters, or through a wired link for one or both of static or dynamic control of the setting parameters.

13. The apparatus of claim of claim 6, further comprising the base station sending the indication of the one or more measurements toward a network node for use with the network node to calculate a position coordinate corresponding to the user equipment using the one or more measurements with knowledge of a location of the reconfigurable reflecting surface, wherein indication of the one or more measurements comprises an indication of whether corresponding measurements are time of arrival, angle of arrival, or reference signal received power measurements.

14. The apparatus of claim of claim 6, further comprising the base station calculating a position coordinate corresponding to the user equipment using the one or more measurements with knowledge of a location of the reconfigurable reflecting surface.

15. An apparatus, comprising:
at least one processor; and
at least one non-transitory memory storing instructions that, when executed with the at least one processor, cause the apparatus to perform:
receiving, with a user equipment and from a base station in a wireless network, a configuration useable with a reconfigurable reflecting surface for adjusting elements of the reconfigurable reflecting surface, the configuration to be used for one or more positioning reference signal transmissions with the base station toward the user equipment, wherein the one or more positioning reference signal transmissions have a direct path between the base station and the user equipment and a reflection path that reflects off the reconfigurable reflecting surface;
receiving, with the user equipment and from the network node, a second configuration to cause the user equipment to perform one or more measurements for the one or more positioning reference signal transmissions;
receiving, with the user equipment and from the network node, the one or more positioning reference signal transmissions;
performing the one or more measurements on signals received during the one or more positioning reference signal transmissions;
sending, with the user equipment and toward the network node, one or more measurement reports comprising indication of the one or more measurements; and
resolving a reflector path signal for the reflection path with using the configuration useable with the reconfigurable reflecting surface; wherein:
receiving, with the user equipment and from the network node, the one or more positioning reference signal transmissions further comprises receiving a superposed received signal from the base station with a switching on of the elements in the reconfigurable reflecting surface and receives a direct path signal with a switching off of the elements in the reconfigurable reflecting surface;
resolving a reflector path signal further comprises subtracting the direct path signal from the superposed received signal.

16. The apparatus of claim 15, wherein the receiving the second configuration to cause the user equipment to perform one or more measurements for the one or more positioning reference signal transmissions comprises a request to perform the one or more measurements on the resolved signal.

\* \* \* \* \*